United States Patent
Kang et al.

(10) Patent No.: US 9,363,810 B2
(45) Date of Patent: Jun. 7, 2016

(54) METHOD AND APPARATUS FOR TRANSMITTING DOWNLINK SIGNAL IN WIRELESS COMMUNICATION SYSTEM

(71) Applicant: LG ELECTRONICS INC., Seoul (KR)

(72) Inventors: Jiwon Kang, Anyang-si (KR); Dongcheol Kim, Anyang-si (KR); Jiwoong Jang, Anyang-si (KR); Hangyu Cho, Anyang-si (KR); Sungho Park, Anyang-si (KR); Dongguk Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/407,841

(22) PCT Filed: Jun. 19, 2013

(86) PCT No.: PCT/KR2013/005409
§ 371 (c)(1),
(2) Date: Dec. 12, 2014

(87) PCT Pub. No.: WO2013/191466
PCT Pub. Date: Dec. 27, 2013

(65) Prior Publication Data
US 2015/0173050 A1     Jun. 18, 2015

Related U.S. Application Data

(60) Provisional application No. 61/661,356, filed on Jun. 19, 2012.

(51) Int. Cl.
*H04W 72/00* (2009.01)
*H04W 72/04* (2009.01)
(Continued)

(52) U.S. Cl.
CPC ........... *H04W 72/042* (2013.01); *H04B 7/0632* (2013.01); *H04B 7/0691* (2013.01);
(Continued)

(58) Field of Classification Search
CPC ... H04W 72/042; H04W 72/02; H04W 72/08; H04W 72/046; H04B 7/0814; H04B 7/0413; H04B 7/0632; H04B 7/1555; H04B 7/04
See application file for complete search history.

(56) References Cited

U.S. PATENT DOCUMENTS 8,149,942 B1 *   4/2012   Wang ................... H04B 7/0617
                                                         375/267
2007/0099584 A1   5/2007   Niu et al.
(Continued)

FOREIGN PATENT DOCUMENTS

JP    2010-087828     4/2010

OTHER PUBLICATIONS

PCT International Application No. PCT/KR2013/005409, Written Opinion of the International Searching Authority dated Sep. 26, 2013, 11 pages.
European Patent Office Application Serial No. 13806440.7, Search Report dated Dec. 8, 2015, 9 pages.

*Primary Examiner* — Erin File
(74) *Attorney, Agent, or Firm* — Lee, Hong, Degerman, Kang & Walmey; Jonathan Kang; Michael Monaco

(57) ABSTRACT

A method and apparatus for transmitting a downlink signal in a wireless communication system are disclosed. An apparatus for receiving a downlink (DL) signal from a base station (BS) and transmitting the received DL signal to a user equipment (UE) in a wireless communication includes: a plurality of reception antennas configured to receive DL signals from the BS; a processor configured to map the received DL signals to at least one transmission antenna; and a plurality of transmission antennas configured to transmit the received DL signals to the UE, wherein the processor is configured to select M transmission antenna(s) from among the plurality of transmission antennas (Ntx,REP Tx antennas), and map the received L signals to the M transmission antenna(s), and the number of the transmission antennas (Ntx,REP) is higher than the number of the reception antennas (Nrx,REP), and M is the number of the transmission antennas which is used to transmit the received DL signals.

13 Claims, 17 Drawing Sheets

(a)

(b)

(51) Int. Cl.
*H04B 7/155* (2006.01)
*H04B 7/06* (2006.01)
*H04B 7/08* (2006.01)
*H04W 72/02* (2009.01)
*H04W 72/08* (2009.01)
*H04M 11/00* (2006.01)
*H04B 7/04* (2006.01)

(52) U.S. Cl.
CPC ............ *H04B 7/0814* (2013.01); *H04B 7/1555* (2013.01); *H04W 72/02* (2013.01); *H04W 72/046* (2013.01); *H04W 72/08* (2013.01); *H04B 7/0413* (2013.01)

(56) References Cited

U.S. PATENT DOCUMENTS

| | | |
|---|---|---|
| 2008/0039030 A1 | 2/2008 | Khan et al. |
| 2008/0293358 A1* | 11/2008 | Andersson ............. H04B 7/022 455/8 |
| 2010/0157876 A1 | 6/2010 | Song et al. |
| 2011/0176585 A1 | 7/2011 | Seo et al. |
| 2012/0004014 A1* | 1/2012 | Ding ..................... H04B 7/024 455/561 |
| 2012/0015603 A1 | 1/2012 | Proctor et al. |
| 2012/0027054 A1 | 2/2012 | Palanki et al. |

* cited by examiner

FIG. 5
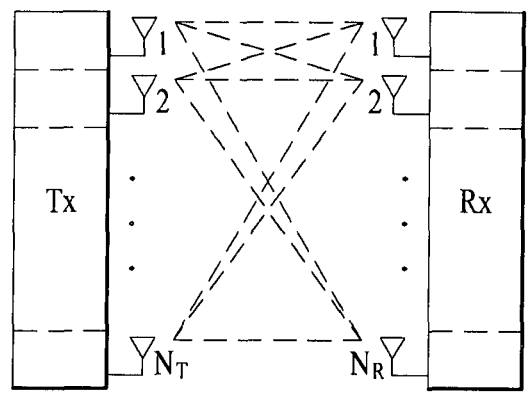
(a)
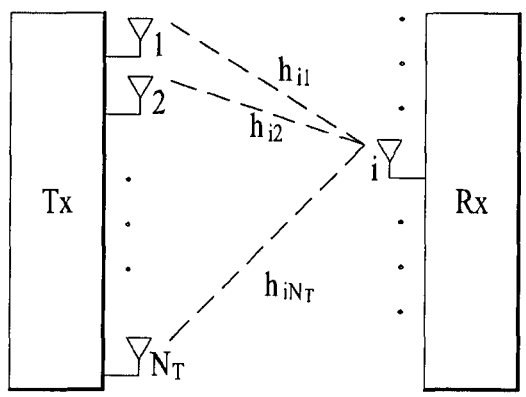
(b)

FIG. 9
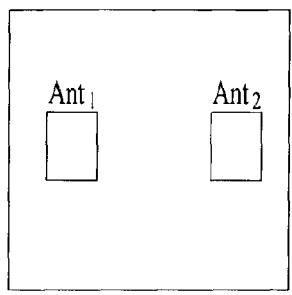
(a)
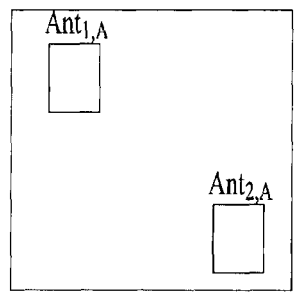
(b)
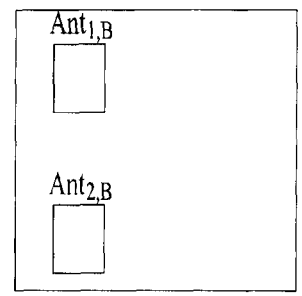
(c)

FIG. 14
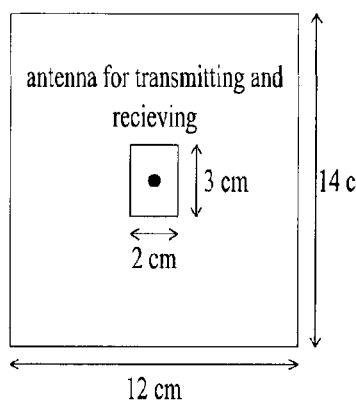
(a)
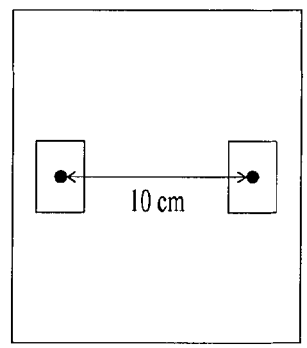
(b)
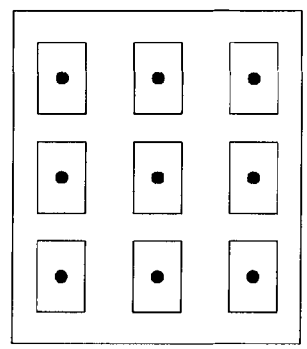
(c)
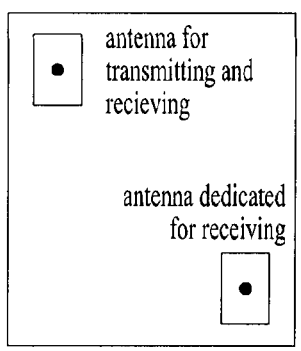
(d)
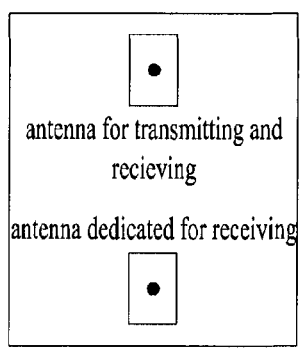
(e)
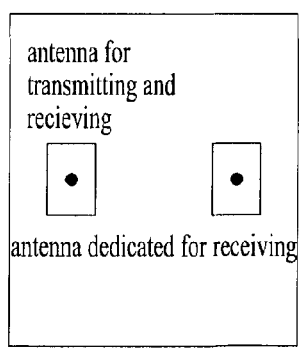
(f)

FIG. 19
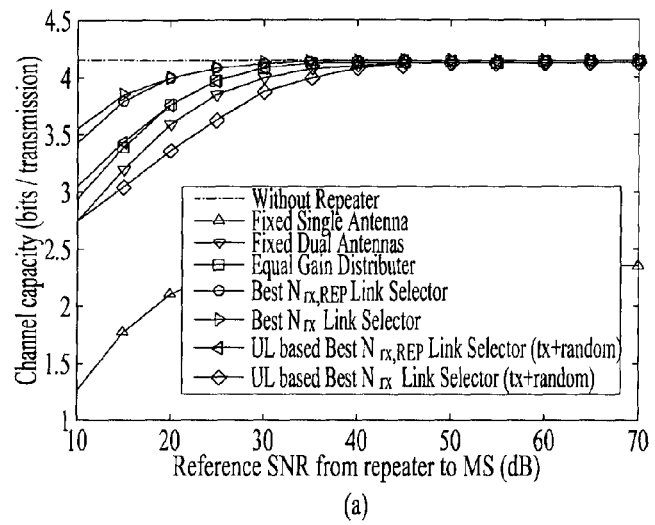
(a)
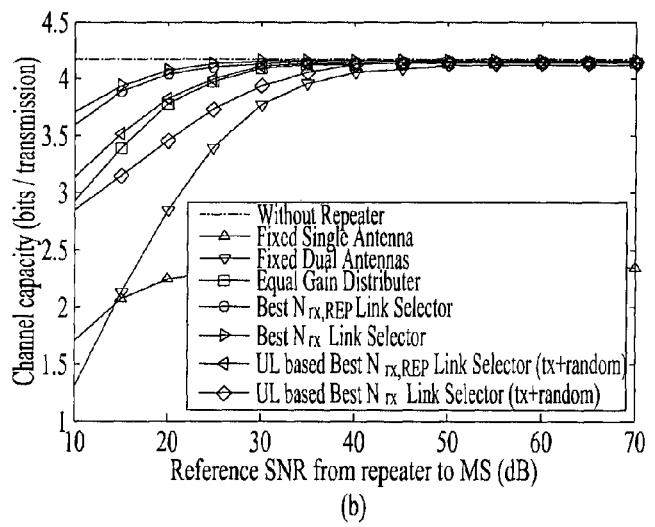
(b)
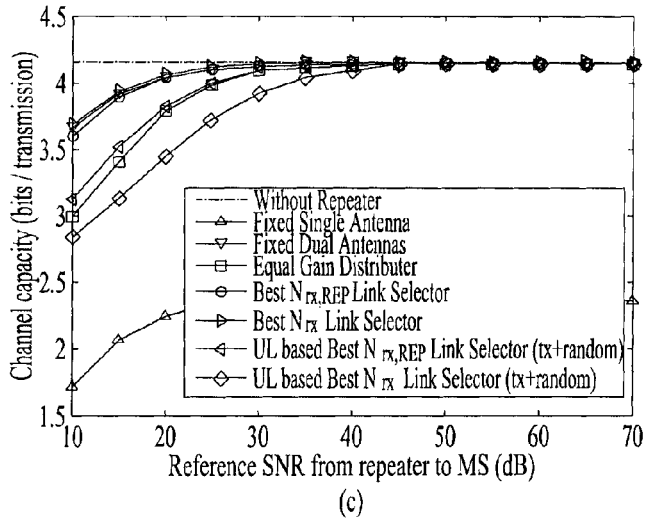
(c)

METHOD AND APPARATUS FOR TRANSMITTING DOWNLINK SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2013/005409, filed on Jun. 19, 2013, which claims the benefit of U.S. Provisional Application Ser. No. 61/661,356, filed on Jun. 19, 2012, the contents of which are all hereby incorporated by reference herein in their entirety.

TECHNICAL FIELD

The present invention relates to a method and apparatus for transmitting a downlink (DL) signal in a wireless communication system, and more particularly to a method and apparatus for implementing downlink Multiple Input Multiple Output (DL MIMO).

BACKGROUND ART

Multiple Input Multiple Output (MIMO) transmission technology uses a plurality of antennas in each of a transmitter and a receiver, such that it raises capacity or SINR (Signal to Interference plus Noise Ratio) in proportion to the number of used antennas. Technology for enabling multiple antennas to be used only in the transmitter is referred to as Multiple Input Single Output (MISO), and technology for enabling a single antenna to be used in a transceiver is referred to as Single Input Single Output (SISO).

Generally, MIMO technology is a generic term for MIMO, SIMO, MIMO, and SIMO technologies.

DISCLOSURE

Technical Problem

Accordingly, the present invention is directed to a method for optimizing MIMO performance in a wireless communication system that substantially obviates one or more problems due to limitations and disadvantages of the related art.

An object of the present invention is to provide various methods for optimizing DL MIMO performance of a contiguous channel in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing an apparatus for receiving a downlink (DL) signal from a base station (BS) and transmitting the received DL signal to a user equipment (UE) in a wireless communication system, the apparatus including: a plurality of reception antennas configured to receive DL signals from the BS; a processor configured map the received DL signals to at least one transmission antenna; and a plurality of transmission antennas configured to transmit the received DL signals to the UE, wherein the processor is configured to select M transmission antenna(s) from among the plurality of transmission antennas ($N_{tx,REP}$ Tx antennas), and map the received DL signals to the M transmission antenna(s), and the number of the transmission antennas ($N_{tx,REP}$) is higher than the number of the reception antennas ($N_{rx,REP}$), and M is the number of the transmission antennas which is used to transmit the received DL signals.

Preferably, if M is higher than the number of the reception antennas ($N_{rx,REP}$), the processor may be configured to distribute at least one received DL signal from among the DL signals and map the received DL signals including the distributed DL signals to the M transmission antennas, and if M is less than the number of the Rx antennas ($N_{rx,REP}$), the processor may be configured to combine at least two received DL signals from among the received DL signals and map the received DL signals including the combined DL signal(s) to the M transmission antennas, wherein the at least two received DL signals are combined or the at least one received DL signal is distributed on the basis of a channel quality between each of the plurality of the transmission antennas and each of reception antennas of the UE.

Preferably, the M may be decided to be one of: the number of reception antennas of the UE ($N_{rx}$), the number of the reception antennas of the reception apparatus ($N_{rx,REP}$), the number of the transmission antennas of the reception apparatus ($N_{tx,REP}$), and an integer that is equal to or higher than 1 and less than $N_{tx,REP}$.

Preferably, the M may be decided based on one of: (a) quality of a signal transmitted from the UE to the reception apparatus, (b) quality of a signal received in the UE from the reception apparatus, and (c) a relationship associated with transmission antenna(s) pre-selected on the basis of (a) or (b).

Preferably, the relationship associated with the pre-selected transmission antenna(s) may include at least one of a distance between the pre-selected transmission antenna(s) and the M transmission antenna(s) to be selected, correlation between the pre-selected transmission antenna(s) and the M transmission antenna(s) to be selected, and statistical characteristics of antenna configuration of the UE.

Preferably, the processor may be configured to receive information of channel quality between the plurality of the transmission antennas and a plurality of reception antennas of the UE.

In accordance with another aspect of the present invention, a method for transmitting a downlink (DL) signal using an apparatus configured to receive a downlink (DL) signal from a base station (BS) and transmit the received DL signal to a user equipment (UE) in a wireless communication system includes: receiving DL signals from the BS through a plurality of reception antennas, mapping the received DL signals to at least one transmission antenna from among a plurality of transmission antennas; and wherein the mapping comprises: selecting M transmission antenna(s) from among the plurality of transmission antennas, and mapping the received DL signals to the M transmission antenna(s), and wherein the number of the transmission antennas ($N_{tx,REP}$) is higher than the number of the reception antennas ($N_{rx,REP}$), and M is the number of the transmission antennas which is used to transmit the received DL signals.

Preferably, the method further includes: if M is higher than the number of the reception antennas ($N_{rx,REP}$), distributing at least one received DL signal from among the received DL signals and mapping the received DL signals including the distributed DL signals to the M transmission antennas, and if M is less than the number ($N_{rx,REP}$) of the Rx antennas, combining at least two received DL signals from among the received DL signals and mapping the received DL signals including the combined DL signals to the M transmission antenna(s), wherein the at least two received DL signals are combined or the at least one received DL signal is distributed on the basis of a channel quality between each of the plurality of the transmission antennas and each of reception antennas of the UE.

Preferably, the M may be decided to be one of: the number of reception antennas of the UE ($N_{rx}$), the number of the reception antennas of the reception apparatus ($N_{rx,REP}$), the number of the transmission antennas of the reception apparatus ($N_{tx,REP}$), and an integer that is equal to or higher than 1 and less than $N_{tx,REP}$.

Preferably, the M may be decided based on one of: (a) quality of a signal transmitted from the UE to the reception apparatus, (b) quality of a signal received in the UE from the reception apparatus, and (c) a relationship associated with transmission antenna(s) pre-selected on the basis of (a) or (b).

Preferably, the relationship associated with the pre-selected transmission antenna(s) may include at least one of a distance between the pre-selected transmission antenna(s) and the M transmission antenna(s) to be selected, correlation between the pre-selected transmission antenna(s) and the M transmission antenna(s) to be selected, and statistical characteristics of antenna configuration of the UE.

Preferably, the method may further include: receiving information of channel quality between the plurality of the transmission antennas and a plurality of reception antennas of the UE.

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention can optimize UL signal transmission.

In addition, embodiments of the present invention can obtain a DL space-diversity gain.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a diagram illustrating a wireless communication system including multiple antennas.

FIG. 9 is a block diagram illustrating a wireless device and a radio frequency (RF) repeater according to one embodiment of the present invention.

FIG. 14 shows an exemplary model of the RF repeater and the first wireless device (UE) for experimenting the effect of embodiments of the present invention.

FIG. 19 shows the simulation result according to link selection scheme shown in FIG. 18.

BEST MODE

Figure 1:
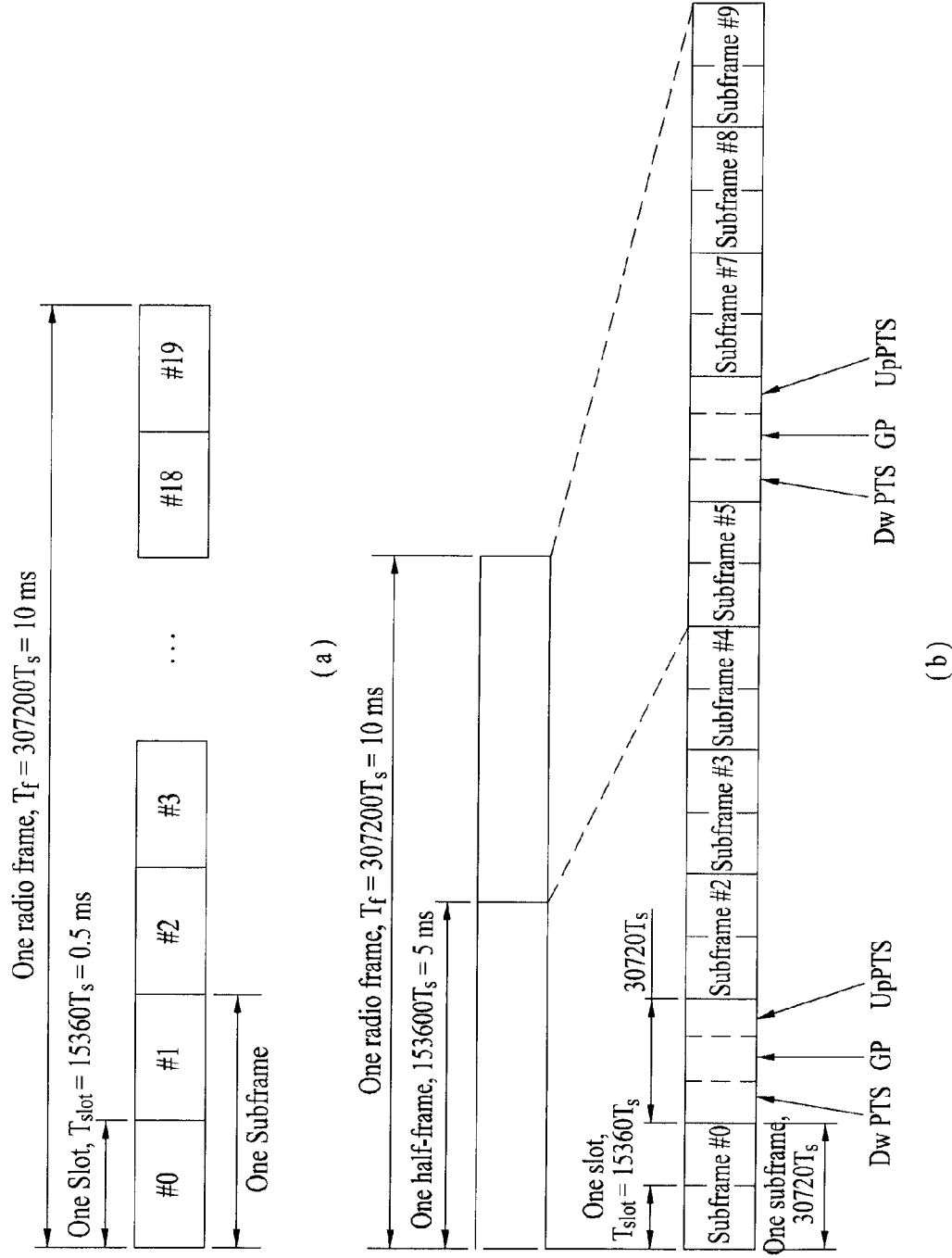
FIG. 1 is a diagram illustrating a radio frame structure for use in a wireless communication system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) may be fixed or mobile and include various apparatuses which communicate with a base station (BS) and transmit and receive user data and/or a variety of control information. The UE may be referred to as a terminal Equipment, a mobile station (MS), a mobile terminal (MT), a user terminal (UT), a subscriber station (SS), a wireless device, a personal digital assistant (PDA), a wireless modem, a handheld device, etc. In the present invention, a base station (BS) refers to a fixed station which communicates with a UE and/or another BS and exchanges a variety of data and control information. The BS is referred to as an advanced base station (ABS), a node-B (NB), an evolved-NodeB (eNB), a base transceiver system (BTS), an access point (AP), a processing server (PS), etc.

In the present invention, a PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) refers to a set of resource elements or a set of time-frequency resources carrying DCI (Downlink Control Information)/CFI (Control Format Indicator)/downlink ACK/NACK (ACKnowlegement/Negative ACK)/downlink data. In addition, a PUCCH (Physical Uplink Control CHannel)/PUSCH (Physical Uplink Shared CHannel) refers to a set of resource elements or a set of time-frequency resources carrying UCI (Uplink Control Information)/uplink data. In the present invention, in particular, time-frequency resources or resource elements (REs) allocated to or belonging to PDCCH/PCFICH/PHICH/PDSCH/PUCCH/PUSCH are referred to as PDCCH/PCFICH/PHICH/PDSCH/PUCCH/PUSCH REs or PDCCH/PCFICH/PHICH/PDSCH/PUCCH/PUSCH resources. Accordingly, in the present invention, transmission of a PUCCH/PUSCH by a UE means that an uplink control information/uplink data/random access signal is transmitted on a PUCCH/PUSCH. In the present invention, transmission of a PDCCH/PCFICH/PHICH/PDSCH by a BS means that downlink data/control information is transmitted on a PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

FIG. 1 is a diagram showing the structure of a radio frame used in a wireless communication system. In particular, FIG. 1(a) shows a radio frame structure used in frequency division duplex (FDD) in 3GPP LTE(-A) and FIG. 1(b) shows a radio frame structure used in time division duplex (TDD) in 3GPP LTE(-A).

Referring to FIG. 1, a radio frame used in 3GPP LTE(-A) has a length of 10 ms (307200·Ts) and includes 10 subframes with the same size. The 10 subframes of the radio frame may be numbered. Ts denotes sampling time, and is represented by Ts=1/(2048*15 kHz). Each of the subframes has a length of 1 ms and includes two slots. The 20 slots of one radio frame may be sequentially numbered from 0 to 19. Each of the slots has a length of 0.5 ms. A time for transmitting one subframe is defined as a transmission time interval (TTI). Time resources, may be divided by a radio frame number (or a radio frame index), a subframe number (or a subframe index), a slot number (or a slot index), etc.

The radio frame may be differently configured according to duplex mode. For example, in an FDD mode, since downlink (DL) transmission and uplink (UL) transmission are divided according to frequency, a radio frame includes only one of a DL subframe or a UL subframe in a predetermined frequency band of a predetermined carrier frequency. In a TDD mode, since downlink (DL) transmission and uplink (UL) transmission are divided according to time, a radio frame includes both a DL subframe and a UL subframe in a predetermined frequency band of a predetermined carrier frequency.

Table 1 shows a DL-UL configuration of subframes within a radio frame, in a TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes three fields of DwPTS (Downlink Pilot TimeSlot), GP (Guard Period) and UpPTS (Uplink Pilot TimeSlot). DwPTS is a time slot reserved for DL transmission and UpPTS is a time slot reserved for UL transmission.

Figure 2:
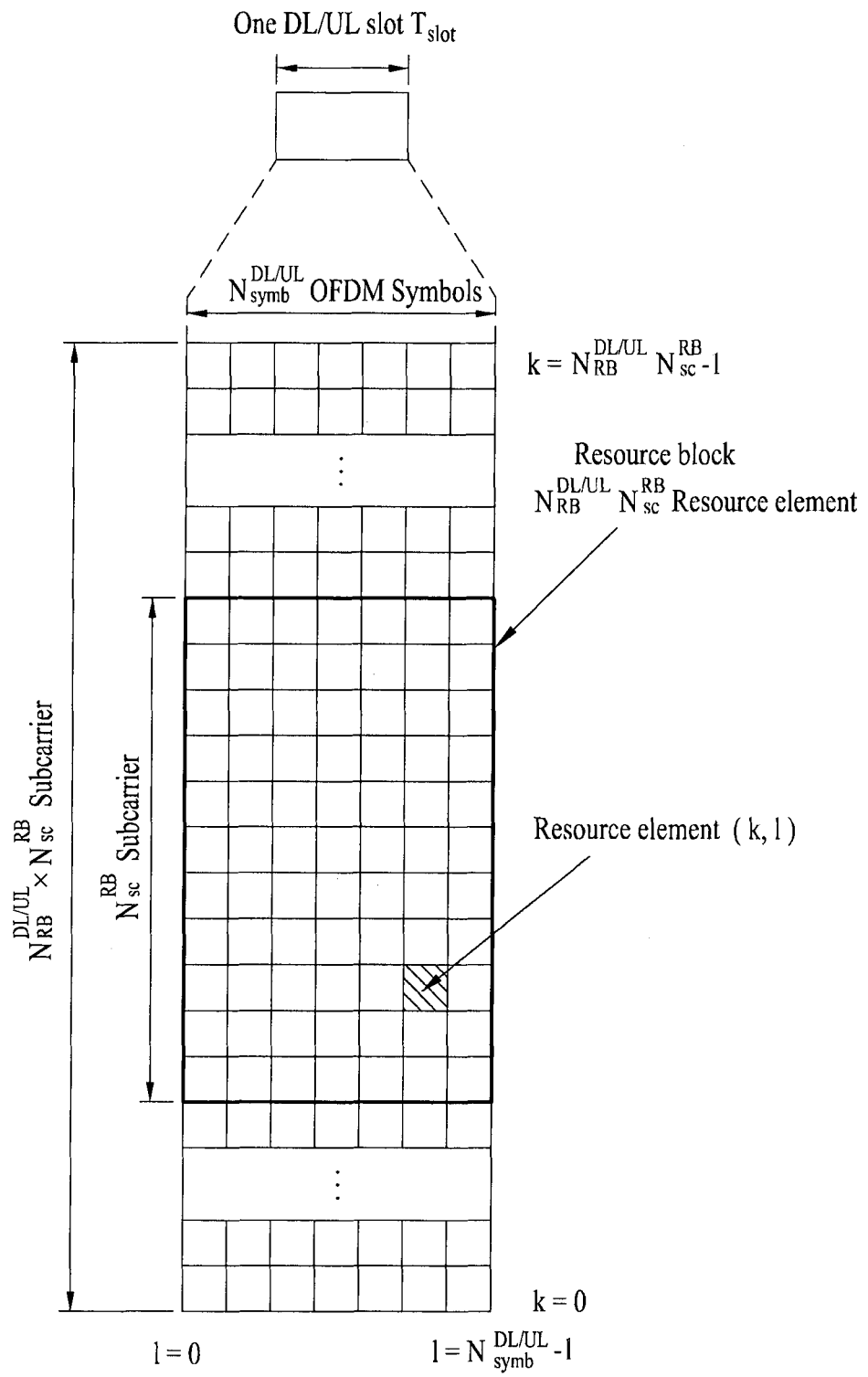
FIG. 2 exemplarily shows a DL/UL slot structure for use in a wireless communication system.

FIG. 2 is a diagram showing an example of a downlink/uplink (DL/UL) slot structure in a wireless communication system. In particular, FIG. 2 shows the structure of a resource grid of a 3GPP LTE(-A) system. One resource grid exists per antenna port.

A slot includes a plurality of orthogonal frequency division multiplexing (OFDM) symbols in a time domain and includes a plurality of resource blocks (RBs) in a frequency domain. The OFDM symbol means one symbol slot. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth. NDLsymb denotes the number of OFDM symbols in a DL slot, NULsymb denotes the number of OFDM symbols in a UL slot, and NRBsc denotes the number of subcarriers configuring one RB.

An OFDM symbol may be referred to as an OFDM symbol, an SC-FDM symbol, etc. according to multiple access scheme. The number of OFDM symbols included in one slot may be variously changed according to channel bandwidth and CP length. For example, in a normal cyclic prefix (CP) case, one slot includes seven OFDM symbols. In an extended CP case, one slot includes six OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes NDL/ULRB*NRBsc subcarriers in a frequency domain. The type of the subcarrier may be divided into a data subcarrier for data transmission, a reference signal subcarrier for reference signal transmission and a null subcarrier for a guard band and a DC component. The null subcarrier for the DC component is unused and is mapped to a carrier frequency f0 in a process of generating an OFDM signal or in a frequency up-conversion process. The carrier frequency is also called a center frequency.

One RB is defined as NDL/ULsymb (e.g., 7) consecutive OFDM symbols in a time domain and defined as NRBsc (e.g., 12) consecutive subcarriers in a frequency domain. For reference, resource including one OFDM symbol and one subcarrier is referred to a resource element (RE) or tone. Accordingly, one RB includes NDL/ULsymb*NRBsc REs. Each RE within a resource grid may be uniquely defined by an index pair (k, l) within one slot. k is an index applied from 0 to NDL/ULRB*NRBsc−1 in a frequency domain, and l is an index from 0 to NDL/ULsymb−1 in a time domain.

In one subframe, two RBs respectively located in two slots of the subframe while occupying the same NRBsc consecutive subcarriers is referred to as a physical resource block (PRB) pair. Two RBs configuring a PRB pair have the same PRB number (or the same PRB index). A VRB is a logical resource allocation unit introduced for resource allocation. The VRB has the same size as the PRB. The VRB is classified into a localized VRB and a distributed VRB according to the method of mapping the PRB to the VRB. Localized VRBs are directly mapped to PRBs and thus VRB number (VRB index) directly corresponds to PRB number. That is, nPRB=nVRB. The localized VRBs are numbered from 0 to NDLVRB−1 and NDLVRB=NDLRB. Accordingly, according to the localized mapping method, VRBs having the same VRB number are mapped to RRBs having the same PRB number in a first slot and a second slot. In contrast, the distributed VRB is mapped to the PRB through interleaving. Accordingly, the distributed VRBs having the same VRB number may be mapped to RRBs having different PRB numbers in a first slot and a second slot. Two PRBs which are respectively located in two slots of a subframe and have the same VRB number are referred to as a VRB pair.

Figure 3:
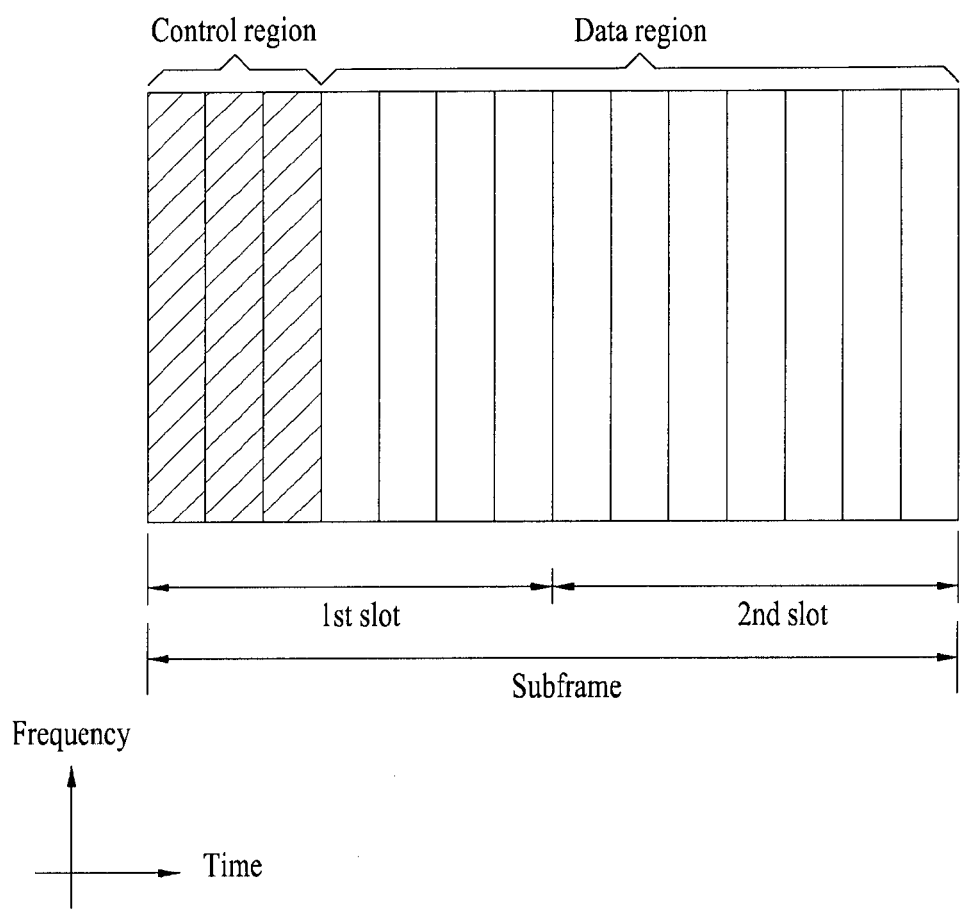
FIG. 3 exemplarily shows a DL subframe structure for use in a 3GPP LTE/LTE-A system.

FIG. 3 is a diagram showing a downlink subframe structure used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbols used in the control region correspond to the data region to which a physical downlink shared channel (PDSCH) is allocated. Hereinafter, a resource region available for PDSCH transmission in a DL subframe is referred to as a PDSCH region. Examples of a DL control channel used in 3GPP LTE include PCFICH (Physical Control Format Indicator Channel), PDCCH (Physical Downlink Control Channel), PHICH (Physical hybrid ARQ indicator Channel), etc. The PCFICH is transmitted in a first OFDM symbol of a subframe and carries information about the number of OFDM symbols used for transmission of a control channel within a subframe. The PHICH carries a HARQ ACK/NACK (acknowledgment/negative-acknowledgment) as a response to UL transmission.

Control transmitted via a PDCCH is referred to as downlink control information (DCI). The DCI includes resource allocation information of a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a Tx power control command set of individual UEs in a UE group, a Tx power control command, activation indication information of voice over IP (VoIP), etc. The size and usage of the DCI carried by one PDCCH may be changed according to DCI format and the size of the DCI may be changed according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
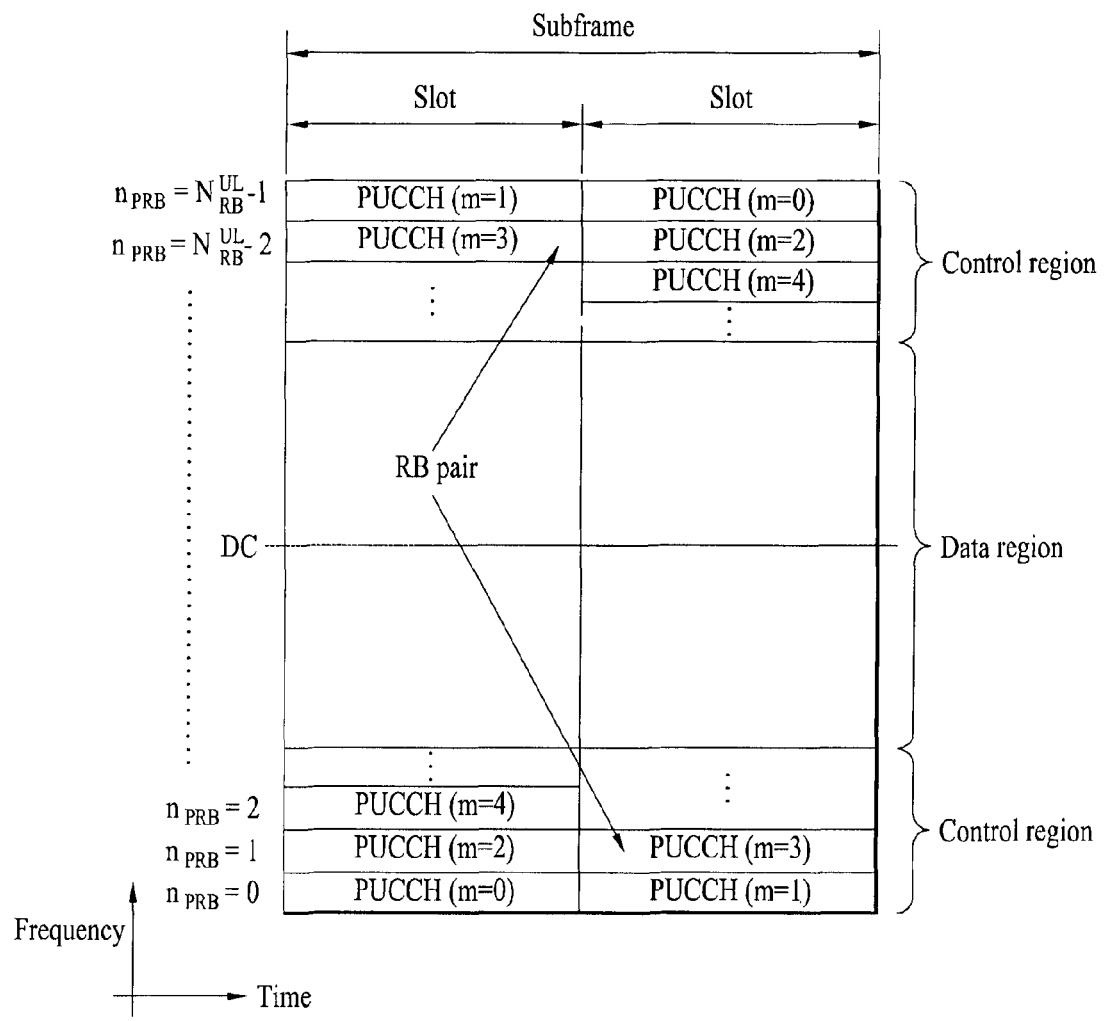
FIG. 4 exemplarily shows an UL subframe structure for use in a 3GPP LTE/LTE-A system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH format 1 series and PUCCH format 3 series are used to transmit ACK/NACK information and PUCCH format 2 series are mainly used to carry channel state information such as CQI (channel quality indicator)/PMI (precoding matrix index)/RI (rank index).

FIG. 5 illustrates a configuration of a wireless communication system having multiple antennas.

As shown in FIG. 5(a), if the number of transmit antennas is increased to $N_T$ and the number of receive antennas is increased to $N_R$, theoretical channel transmission capacity is increased in proportion to the number of antennas, unlike the case where a plurality of antennas is used in either a transmitter or a receiver. Accordingly, it is possible to improve transmission rate and to remarkably enhance frequency efficiency. As the channel transmission capacity is increased, the transmission rate may be theoretically increased by a product of a maximum transmission rate $R_0$ upon using a single antenna and a rate increase ratio $R_i$.

$$R_i = \min(N_T, N_R) \qquad \text{[Equation 1]}$$

For example, in a MIMO communication system using four transmit antennas and four receive antennas, a transmission rate which is four times that of a single antenna system may be theoretically obtained.

A communication method in the MIMO system is described in more detail using mathematical modeling. In the above system, it is assumed that $N_T$ transmit antennas and $N_R$ receive antennas are present.

In a transmission signal, if $N_T$ transmit antennas are present, a maximum number of pieces of transmission information is $N_T$. The transmission information may be expressed as follows.

$$s = [s_1, s_2, \ldots, s_{N_T}]^T \qquad \text{[Equation 2]}$$

Individual transmission information pieces $s_1, s_2, \ldots, s_{N_T}$ may have different transmit powers. If the respective transmit powers are denoted by $P_1, P_2, \ldots, P_{N_T}$, transmission information having adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ may be expressed using a diagonal matrix P of a transmit power as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

It is assumed that $N_T$ transmission signals $x_1, x_2, \ldots, x_{N_T}$ to be actually transmitted are configured by applying a weight matrix W to the transmit power adjusted information vector $\hat{S}$. The weight matrix W serves to appropriately distribute transmission information to individual antennas according to a transport channel situation. $x_1, x_2, \ldots, x_{N_T}$ may be expressed using a vector X as follows.

$$x = \begin{bmatrix} x_1 \\ x_2 \\ \vdots \\ x_i \\ \vdots \\ x_{N_T} \end{bmatrix} \qquad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

where, $w_{ij}$ denotes a weight between an i-th transmit antenna and a j-th information. W is also called a precoding matrix.

If $N_R$ receive antennas are present, respective reception signals $y_1, y^2, \ldots, y_{N_R}$ of the antennas may be expressed as follows.

$$y = [y_1, y_2, \ldots, y_{N_R}]^T \quad \text{[Equation 6]}$$

In modeling channels of the MIMO wireless communication system, the channels may be distinguished from each other according to transmit/receive antenna indexes. A channel passing from a transmit antenna j to a receive antenna i is denoted as $h_{ij}$. In an index order of $h_{ij}$, it is noted that an index of a receive antenna precedes an index of a transmit antenna.

FIG. 5(b) illustrates channels passing from the $N_T$ transmit antennas to the receive antenna i. The channels may be expressed in the form of a combination of a vector and a matrix. In FIG. 5(b), the channels passing from the $N_T$ transmit antennas to the receive antenna i may be represented as follows.

$$h_i^T = [h_{i1}, h_{i2}, \ldots, h_{iN_T}] \quad \text{[Equation 7]}$$

Accordingly, all channels passing from the $N_T$ transmit antennas to the $N_R$ receive antennas may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Additive White Gaussian Noise (AWGN) is added to actual channels passing through the channel matrix H. AWGN $n_1, n_2, \ldots, n_{N_R}$ added to the respective $N_R$ receive antennas may be expressed as follows.

$$n = [n_1, n_2, \ldots, n_{N_R}]^T \quad \text{[Equation 9]}$$

According to the above-described mathematical modeling method, a reception signal may be expressed as follows.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Meanwhile, the numbers of rows and columns of the channel matrix H indicating a channel state are determined by the number of transmit and receive antennas. The number of rows of the channel matrix H is equal to the number of receive antennas, $N_R$, and the number of columns thereof is equal to the number of transmit antennas, $N_T$. That is, the channel matrix H is an $N_R \times N_T$ matrix.

A matrix rank is defined by the smaller of the number of rows and the number of columns, where the rows and the columns are independent of each other. Accordingly, the matrix rank cannot be greater than the number of rows or columns. The rank of the channel matrix H, rank(H), is restricted as follows.

$$\text{rank}(H) \leq \min(N_T, N_R) \quad \text{[Equation 11]}$$

Another definition of rank may be given as the number of non-zero Eigen values when a matrix is subjected to Eigen value decomposition. Similarly, rank may be defined as the number of non-zero singular values when a matrix is subjected to singular value decomposition. Accordingly, the physical meaning of rank in a channel matrix may be a maximum number of elements capable of transmitting different information via a given channel.

Presently, various wireless devices are widely used throughout the world, such that the number of service types is rapidly increasing. Assuming that past radio data transmission is achieved on the basis of audio data (especially, voice data), current radio data transmission has been developed in various formats such as audio, video, photo, and document transmission forms, such that a data transfer rate is exponentially increased. As such, wireless communication standards for providing a higher transfer rate have recently been proposed. For example, LTE(-A) acting as one representative example of the next generation cellular communication can communicate with another party at a higher speed (i.e., a maximum transfer rate of 1 GB/s) that is faster than that of HSDPA by twelve times or greater, using OFDM and MIMO technologies. However, wireless communication standards capable of transmitting data at high speed can be achieved on the assumption of ideal environmental factors such as speed, channel environment, time/frequency allocation, etc. A data transfer rate capable of being actually experienced by a user is substantially lower than the maximum speed of the wireless communication standards. Specifically, performance of a wireless communication device considering a wireless channel environment is greatly influenced by a channel environment between transceiver devices of signals. Representative examples may be the presence or absence of an obstacle, the distribution of obstacles, device movement speed, etc. In case of using MIMO technology, as one important technology capable of improving data transfer rate, device restrictions caused by the design and arrangement of antennas may affect the MIMO technology.

Figure 6:
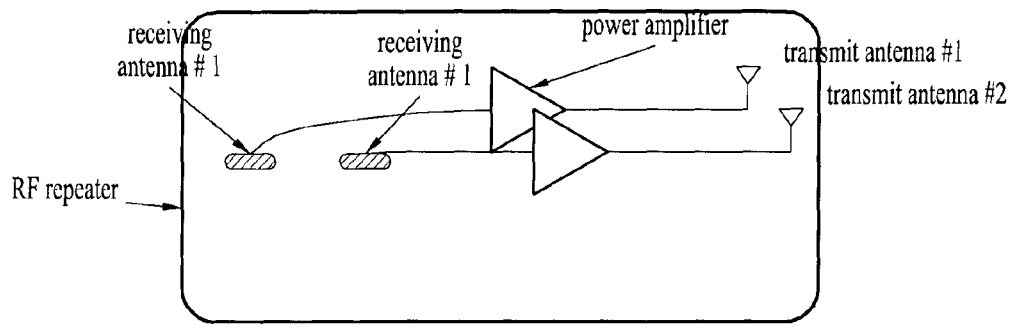
FIG. 6 is a block diagram illustrating a radio signal (RF) repeater according to one embodiment of the present invention.

Under various environmental and physical restricted situations, a repeater capable of amplifying RF signals may be used to compensate for performance deterioration of wireless devices. In case of using a general RF repeater, a method for receiving an RF signal of a wireless device, amplifying a signal including noise and interference, and retransmitting the amplified signal has been used. FIG. 6 is a conceptual diagram illustrating a general RF repeater.

Figure 7:
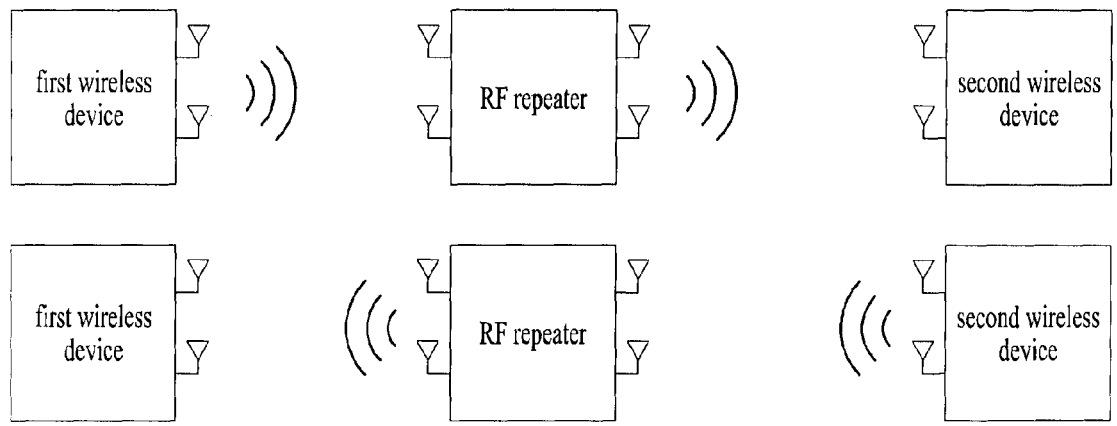
FIG. 7 shows a wireless communication environment according to one embodiment of the present invention.
Figure 8:
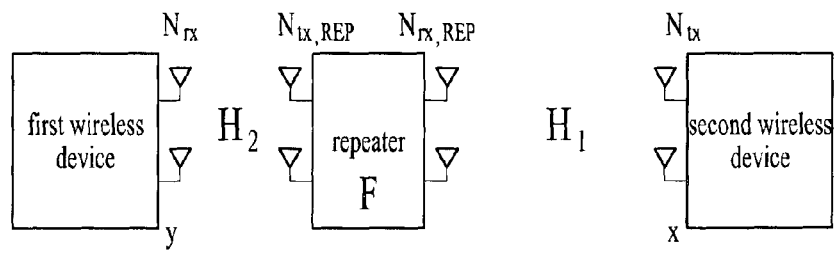
FIG. 8 exemplarily shows mathematical modeling of a wireless communication environment according to one embodiment of the present invention.

An RF repeater is generally located between a first wireless device and a second wireless device as shown in FIG. 7, the power amplifier receives and amplifies a transmission signal of the first wireless device, and transmits the amplified signal to the second wireless device. Simultaneously or alternately, the power amplifier receives and amplifies a transmission signal of the second wireless device, and transmits the amplified signal to the first wireless device. In this case, the term "wireless device" may conceptually include all of a base station (BS), a user equipment (UE) and equivalents thereof. Although Tx/Rx antennas of the RF repeater may be embedded into the RF repeater, assuming that a material (e.g., an outer wall of a building) interrupting signal transmission is located between the first wireless device and the second wireless device, some antennas may be installed outside of the RF repeater to remove the influence caused by the signal transmission material, such that the antennas may be coupled to the signal amplifier by wire.

Referring to FIG. 7, functions of the RF repeater located adjacent to the first wireless device may be classified into a first function (i.e., function for amplifying the transmission signal) for amplifying a transmission signal of the first wireless device and transmitting the amplified signal to the second wireless device, and a second function (i.e., function for amplifying the reception signal) for receiving and amplifying a transmission signal from the second wireless device and transmitting the amplified signal to the first wireless device. The present invention proposes a signal repeater antenna configuration and link generation scheme for enabling the device-adjacent-type RF repeater to optimize the Rx signal amplification function.

Mathematical modeling of the MIMO RF repeater system will hereinafter be described in detail. Generally, MIMO channels composed of $N_{tx}$ Tx antennas and $N_{rx}$ Rx antennas may be modeled by a ($N_{rx} \times N_{tx}$) matrix (i.e., ($N_{rx}$ by $N_{tx}$) matrix) within a frequency domain assuming frequency flat fading. Although the MIMO channel is extended to a frequency selective broadband channel, it may be modeled into the ($N_{rx} \times N_{tx}$) matrix for each subframe, and an independent MIMO Tx/Rx scheme for each subcarrier may be applied to a MIMO-OFDM system. Therefore, the following description may be based on narrowband channel modeling for convenience of description. The case in which the following result is extended to broadband will be described later.

It is assumed that the number of Tx antennas of the second wireless device is denoted by $N_{tx}$, the number of Rx antennas of the first wireless device is denoted by $N_{rx}$, the number of Rx antennas of the RF repeater is denoted by $N_{rx,REP}$, and the number of Tx antennas of the RF repeater is denoted by $N_{tx,REP}$. In this case, a channel between the second wireless device and the RF repeater may be modeled into a ($N_{rx,REP} \times N_{tx}$) matrix ($H_1$), and a channel between the first wireless device and the RF repeater may be modeled into a ($N_{rx} \times N_{tx,REP}$) matrix ($H_2$). Assuming that the RF repeater is a linear system for connecting signals received through $N_{rx,REP}$ antennas to $N_{tx,REP}$ antennas and then amplifying the connected resultant signals, the result may be modeled into a ($N_{tx,REP} \times N_{rx,REP}$) matrix (F). Therefore, assuming that signals transmitted through antennas of the second wireless device are denoted by a ($N_{tx} \times 1$) vector (x), the ($N_{rx} \times 1$) vector (y) received through the antenna of the first wireless device is represented by the following equation 12.

$$y = H_2 F H_1 x + H_2 F z_1 + z_2 \quad \text{[Equation 12]}$$

In Equation 12, $z_1$ is noise and interference received through Rx antennas of the RF repeater, and $z_2$ is noise and interference received through Rx antennas of the first wireless device.

If the first wireless device is located close to the RF repeater, the distance and the beampattern direction between each Rx antenna of the first wireless device and each Tx antenna of the RF repeater may be changed. Therefore, respective elements of the channel $H_1$ have different average magnitudes unlike a general MIMO channel. For example, it is assumed that Rx antennas of the first wireless device and the Tx antennas of the RF repeaters are configured as shown in FIG. 9. Assuming that the first wireless device is mounted to the RF repeater (i.e., if the first wireless device is placed on the RF repeater), the first Rx antenna ($Ant_1$) of the first wireless device will receive a relatively strong signal from the first Tx antenna ($Ant_{1,A}$) of the RF repeater A, and the second Rx antenna ($Ant_2$) will receive a relative strong signal from the second Tx antenna ($Ant_{2,A}$) of the RF repeater A.

The antenna position of the RF repeater greatly affects performance of the RF repeater due to unique characteristics of the contiguous channel ($H_2$). For example, assuming that the RF repeater B is used to communicate with the first wireless device in FIG. 9, Rx signal sensitivity of the first Rx antenna ($Ant_1$) of the first Rx antenna of the first wireless device may be greatly higher than that of the second Rx antenna ($Ant_2$), resulting in distortion of a effective channel (corresponding to $H_2 F H_1$ of Equation 12) and deterioration of MIMO performance of the first wireless device. In more detail, a effective channel is formed as if only one Tx antenna is used even though the first wireless device has two Rx antennas in the case of using the RF repeater B, such that obtaining sufficient spatial diversity gain may be difficult.

Assuming that the antenna position of the RF repeater is well designed, although spatial correlation characteristics of multiple antennas of the first wireless device are poor, the RF repeater can overcome the poor spatial correlation characteristics, such that MIMO performance can be maximized. For example, although correlation among Rx antennas of the first wireless device is very high, assuming that Tx antennas of the RF repeater are adjacent to Rx antennas of the first wireless device on a one to one basis and correlations among Rx antennas of the RF repeater are low, it may be possible to obtain the effect that poor-correlation Rx antennas of the first wireless device are replaced with high-performance Tx antennas of the RF repeater. That is, Rx correlation of $H_2 F H_1$ corresponding to a effective channel in Equation 12 may be reduced either through design optimization of the F value corresponding to signal transmission (channel) characteristics of the Tx antenna of the RF repeater or matching a physical position of the Tx antenna of the RF repeater to the Rx antenna of the first wireless device, and thus a contiguous channel $H_1$ is diagonalized. Therefore, Tx antennas of the RF repeater must be physically or algorithmically mapped to Rx antennas of the first wireless device on a one to one basis, so as to establish a link. Assuming that the RF repeater is universally used, it is difficult to match physical antenna positions to all kinds of first wireless devices. Therefore, the embodiments of the present invention disclose the following proposals.

Proposal: The RF repeater is configured to have many more Tx antennas than Rx antennas ($N_{rx,REP} < N_{tx,REP}$), and the scheme for connecting signals received through Rx antennas of the RF repeater to signals to be transferred to individual Tx antennas may be changed to another scheme as necessary. The RF repeater selects M Tx antennas (where $M \leq N_{tx,REP}$) from among a plurality of Tx antennas, and connects/amplifies signals received through each Rx antenna. In this case, a positive (+) integer M is decided one of either the following parameters $N_{rx}$, $N_{tx,REP}$, $N_{rx,REP}$, or an arbitrary integer that is less than ($N_{tx,REP}$) or equal to and higher than 1.

$N_{rx}$ is the number of Rx antennas of the first wireless device.

$N_{tx,REP}$ is the number of Tx antennas of the RF repeater.

$N_{rx,REP}$ is the number of Rx antennas of the RF repeater.

The arbitrary integer is less than ($N_{tx,REP}$) or equal to and higher than 1.

If M is less than $N_{tx,REP}$ during generation of an Rx link, at least one of the following references may be used as a reference for selecting a Tx antenna of the RF repeater.

First Reference: Rx quality of a plurality of Rx antennas of RF repeater regarding Rx signals of the first wireless device.

Second Reference: Rx quality (that requires feedback of the first wireless device) of each Rx antenna of the first wireless device regarding Tx signals from the RF repeater to the first wireless device.

Third Reference: antenna combination characteristics with preselected Tx antenna(s) (for example, distance between antennas, correlation between antennas, statistical characteristics of an antenna configuration of the first wireless device).

The first reference is more efficiently used when the RF repeater simultaneously uses the Rx signal amplification function and the Tx signal amplification function of the first wireless device. If the RF repeater can also perform the Tx signal amplification function of the first wireless device, the RF repeater may measure Rx quality of multiple Rx antennas of the RF repeater, and estimate the position of Tx antennas of the first wireless device according to the measurement result. The position(s) of Tx antenna(s) of the first wireless device may be determined to be the position(s) of Rx antenna(s) of the first wireless device on the basis of the Rx quality obtained at various positions of the RF repeater associated with Tx signals of the first wireless device because Tx antennas of most wireless devices can also serve as Rx antennas. Therefore, Tx antenna(s) located at the position of superior Rx signal quality of the RF repeater may be selected with respect to transmission of the first wireless device.

Although the first reference is considered as a superior method when the RF repeater can amplify Tx/Rx signals, employing only the first reference is considered insufficient in some cases. Specifically, LTE Rel-8 UEs have been widely introduced to the market, and each LTE Rel-8 UE includes one Tx/Rx antenna and one Rx dedicated antenna. Therefore, assuming that the first reference is applied to the RF repeater of LTE Rel-8 UE, although the position of Tx/Rx antenna of the corresponding UE can be derived through uplink, it is impossible to recognize the position of Rx dedicated antenna.

A second reference discloses a definite method for overcoming limitation of the first reference. The second reference may use the Rx quality of the first wireless device with respect to Tx signals of each Tx antenna of the RF repeater. That is, the first wireless device may measure the quality of the Tx signal of each Tx antenna of the RF repeater, and inform the RF repeater of the Tx signal quality. The second reference is the most definite method for recognizing the Rx antenna position of the first wireless device.

A third reference used as another antenna selection method may select some of M antennas to be selected using the first reference or other references, and may use the remaining antennas to be selected using the relationship related to preselected antenna(s). For example, in case of $N_{tx,REP}=9$ and $M=N_{rx}=2$ for LTE Rel-8 UE, the following steps may be carried out as follows.

First step: Rx quality of the RF repeater is measured with respect to the Tx signal of the first wireless device such that Tx antennas of one RF repeater is selected.

Second step: One of the remaining 8 Tx antennas is selected in consideration of the relationship (for example, distance, correlation, and statistical characteristic of antenna configuration) related to a Tx antenna selected in the first step.

That is, according to the third reference, the remaining antennas are selected in consideration of the relationship related to preselected Tx antennas when some Tx antennas are selected from among M Tx antennas on the basis of an arbitrary reference. Distance between Tx antennas, correlation between Tx antennas, and statistical characteristics of antenna configuration of the first wireless device may be used as examples of the above-mentioned relationship. For example, the remaining antennas can be selected from among multiple antennas that are spaced apart from preselected Tx antennas by a predetermined distance or greater simultaneously while having a predetermined spatial correlation or less. In accordance with another example, considering antenna-configuration statistical characteristics of the first wireless device on the basis of the position of a pre-selected Tx antenna, antenna(s) located close to the position having the highest Rx-antenna presence possibility related to the remaining Rx antennas of the first wireless device can be primarily selected.

In accordance with the reception (Rx) link generation scheme proposed by the present invention, if an optimum Rx link generation scheme is decided once, in so far as the position of the first wireless device may be changed or an event for changing the first wireless device is changed to another device does not occur, the above-mentioned transmission link generation scheme can be maintained.

Figure 10:
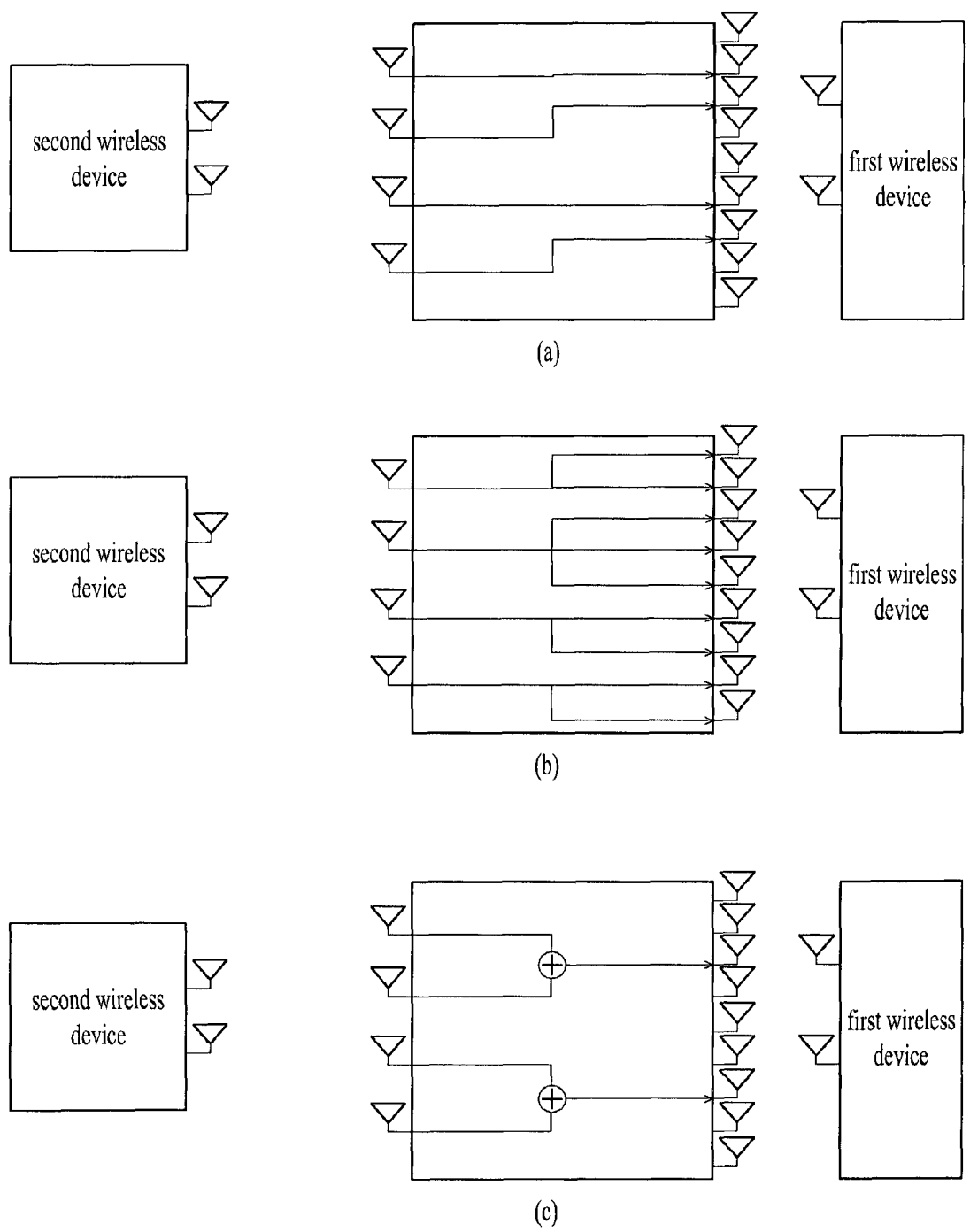
FIG. 10 is a conceptual diagram illustrating a link mapping scheme according to one embodiment of the present invention.

FIG. 10 exemplarily shows various link decision schemes. The number of Tx/Rx antennas of the RF repeater should be higher than the number of Rx antennas of the first wireless device (i.e., $N_{rx,REP}>N_{rx}$ and $N_{tx,REP}>N_{rx}$) so that performance can be maximized. Therefore, $N_{tx}=2$, $N_{rx}=2$, $N_{tx,REP}=9$, and $N_{rx,REP}=4$ are assumed in FIG. 10. The link decision scheme according to the present invention refers to a method for mapping a plurality of Rx signals received through Rx antennas to a plurality of Tx antennas from the viewpoint of the RF repeater, and is largely classified into link distribution and link combination.

FIG. 10(a) shows the case of $M=N_{rx,REP}$. In case of $N_{tx,REP}>M$, 'selection of Tx antenna' is needed. That is, only M Tx antennas from among $N_{tx,REP}$ Tx antennas are selected according to characteristics of the first wireless device, and are connected to individual Rx antennas, resulting in link generation.

FIG. 10(b) shows the case of $M=N_{tx,REP}$. In case of $M>N_{rx,REP}$, one antenna Tx antenna can be transmitted through a plurality of Tx antennas in such a manner that link distribution is achieved. In this specification, the term "link" refers to connection through which signals received through Rx antennas (or Rx antenna ports) are transmitted to Tx antennas (or Tx antenna ports). Therefore, the term 'link' may be interchangeably used with the term 'Rx signal'.

The link distribution scheme of the RF repeater may be configured irrespective of characteristics of the first wireless device, or may be adaptively configured according to antenna characteristics of the first wireless device. In the latter case, according to antenna characteristics of the first wireless device, the RF repeater may determine which Rx signals will be distributed to many more signals (i.e., link ordering) or which Rx antenna will be grouped (i.e., link grouping). For example, although each of three Rx signals of FIG. 10(b) is connected to two Tx antennas, one Rx signal is connected to three Tx antennas. In this case, according to which one of references is used as a selection reference for selecting a link to be distributed to three parts from among four Rx signals, or according to how to group 9 Tx antennas into 4 groups so as to generate a link, a MIMO performance of the first wireless device may be changed. Therefore, the latter case may consider a channel quality and/or preference between a Tx antenna of each RF repeater and an Rx antenna (Tx/Rx antenna) of the first wireless device of the first wireless device in association with the link distribution scheme.

Referring to a preference between each Tx antenna of the RF repeater and Rx antenna of the first wireless device, the first to fifth Tx antennas of the RF repeater shown in FIG. 10(b) are located closer to the first Rx antenna of the first wireless device as compared to the second Rx antenna of the first wireless device so as to prefer the first Rx antenna, and the sixth to ninth Tx antennas of the RF repeater are located closer to the second Rx antenna of the first wireless device as compared to the first Tx antenna of the first wireless device so as to prefer the second Rx antenna. Link grouping can be carried out in consideration of such Rx antenna preference.

For example, in order to reduce correlation between Rx antennas, (a) Tx antennas having the same preferred Rx antennas may be grouped into one group. In contrast, in order to stability instantaneous channel unbalance of an external channel ($H_1$) (in the pursuit of spatial multiplexing), and (b) Tx antennas having the same preferred Rx antennas may be grouped in such a manner that the Tx antennas belong to different groups.

The antenna preference of the first wireless device and the RF channel quality between Tx/Rx antennas may be used as the important elements for deciding the link distribution scheme. Signal intensity, SNR, SINR, etc. may be used as examples of the above quality. Generally, although the above-mentioned quality may indicate the quality of a signal from each Tx antenna of the RF repeater to all Rx antennas of the first wireless device, the quality may further include a quality of a signal received through each Rx antenna of the first wireless device. In the latter case, if antenna gains are different from each other due to physical characteristics between Rx antennas of the first wireless device, the above quality may also include such difference as necessary.

In the former case, some Tx antennas of 9 Tx antennas of the RF repeater are relatively far from all Rx antennas of the first wireless device, such that the channel quality may be deteriorated. A difference in RF-channel quality between Tx/Rx antennas may be used for antenna ordering or antenna grouping. For example, in order to maximize Rx diversity of the first wireless device, grouping can be carried out in such a manner that Tx/Rx qualities of individual Tx antenna groups can be equalized. In this case, in case of using high-quality Tx antennas, a small number of Tx antennas may comprise a single group, or a predetermined number of high-quality Tx antennas may be grouped into different groups.

In contrast, in order to stably signals of the first wireless device at a low Rx-signal sensitivity region, grouping may be carried out to intentionally achieve non-uniform Tx/Rx qualities of individual Tx antenna groups. For example, when one primary Rx antenna and one secondary Rx antenna are present in the first wireless device, some Tx antennas each having a relatively high channel quality from among Tx antennas preferring primary Rx antennas are grouped so that stable wireless connection can be guaranteed.

FIG. 10(a) shows the case of $M=N_{rx}$. In this case, if $N_{rx,REP}>M$, multiple Rx signals are integrated into one Rx signal simultaneously with the Tx antenna selection process, so that the link combining process connected t one Tx antenna is achieved. Link combining may be configured irrespective of characteristics of the first wireless device, or may be adaptively configured according to antenna characteristics of the first wireless device. In the latter case, the link combining method may be changed according to a channel quality between each Tx antenna of the RF repeater and an antenna (Rx antenna or Tx/Rx antenna) of the first wireless device. For example, in case of $N_{rx,REP}=3$ and $M=N_{rx}=2$, two Tx signals from among three Rx signals are combined and linked to one Tx antenna, and the remaining one Rx signal may be linked to one Tx antenna. Performance may be changed according to which two of three Tx signals will be combined with each other. Assuming that two Tx antennas have already been selected from among a plurality of Tx antennas, one of two Tx antennas is combined and connected to two Rx signals, and the other one is connected to only the remaining one Rx signal. Assuming that gains obtained from two power amplifiers are equal to each other when the RF repeater transmits the signal to the first wireless device, the combined link can result in average of qualities of two links. That is, as the number of signal combinations increases, the channel hardening phenomenon becomes serious (i.e., instantaneous variance of the channel quality becomes smaller) due to higher diversity. Assuming that the above-mentioned phenomenon is applied to the link combining method, the embodiment may control the first wireless device from among two selected Tx antennas to perform many more or less link combinations for higher-Rx-quality antennas.

Although not shown in FIG. 10, the number of selected Tx antennas due to hardware design may be fixed to an arbitrary integer (where $1 \leq integer < N_{tx,REP}$). In this case, according to the relationship between the number ($N_{rx,REP}$) of Rx antennas of the RF repeater and the M value, "link combining" or "link distribution" may be achieved along with "Tx antenna selection".

If the antenna configuration and Rx-signal link generation scheme of the RF repeater proposed by the present invention are extended to a broadband system, the link generation scheme for different Rx signals and/or the antenna configuration may be designed per frequency band (capable of being replaced with various frequency units such as band, subband, RB, carrier, subcarrier, etc.). However, considering implementation complexity and associated performance gain trade-off, the above-mentioned method is considered to be a good method for applying the same link generation method to all bands.

Figure 11:
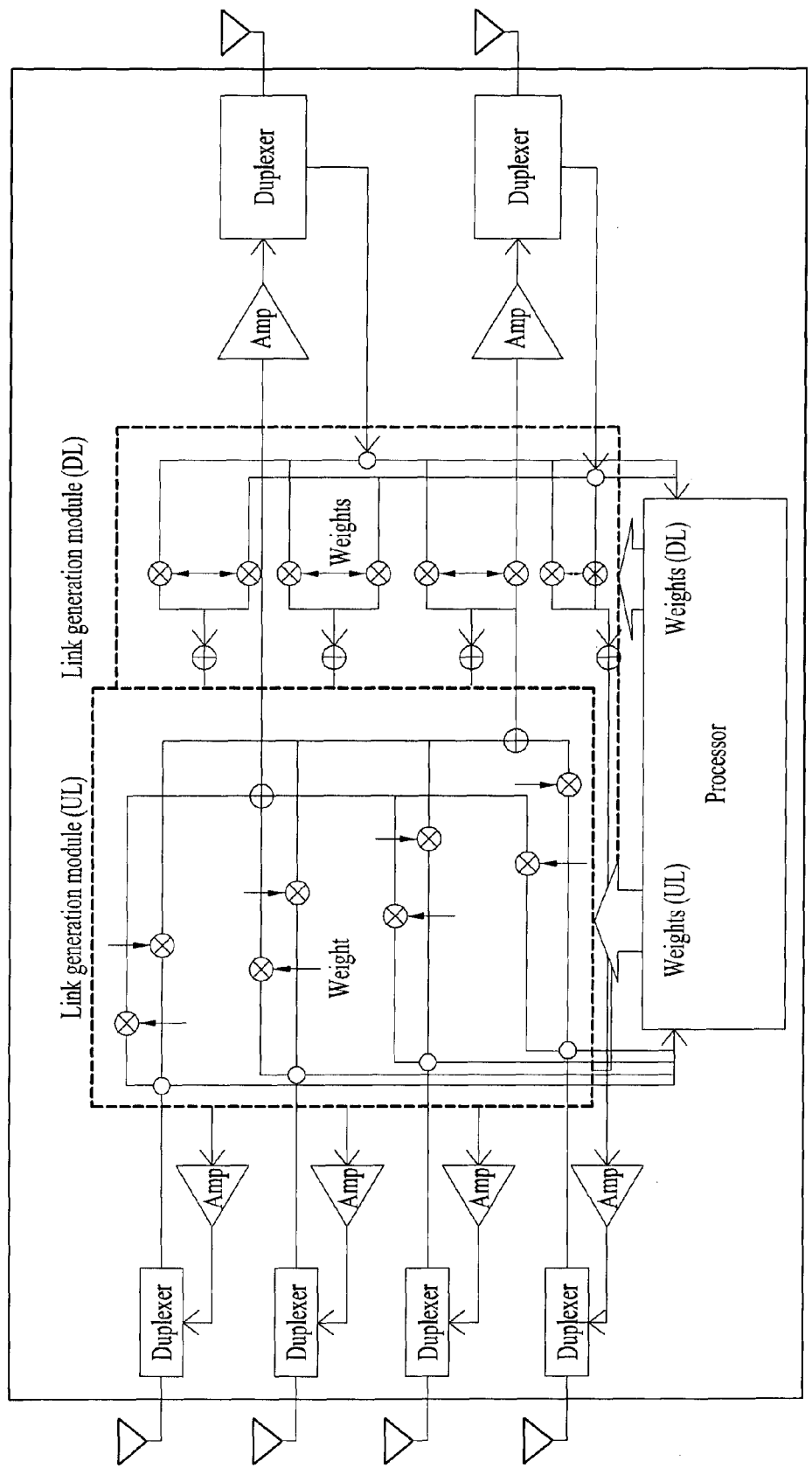
FIG. 11 is a block diagram illustrating a radio frequency (RF) repeater according to one embodiment of the present invention.

FIG. 11 is a circuit diagram illustrating the RF repeater based on the signal amplification scheme. In FIG. 11, it is assumed that the first wireless device is a cellular UE, the second wireless device is an eNB or BS, and $N_{tx,REP}=4$ and $N_{rx,REP}=2$.

In FIG. 11, the RF repeater performs both the Tx signal amplification function of the first wireless device and the Rx signal amplification function of the first wireless device. The link generation scheme proposed by the present invention corresponds to the method for controlling a downlink generation module corresponding to the Rx signal amplification function. In the example of FIG. 11, the Rx antennas of the RF repeater from the viewpoint of the Tx signal amplification function of the first wireless device are identical in function to the Tx antennas of the RF repeater from the viewpoint of the Rx signal amplification function of the first wireless device. Therefore, RF-repeater Rx antenna(s) selected for the Tx signal amplification function may be identical to Tx antenna(s) selected for the Rx signal amplification function.

[Simulation]

In order to testify technical effects of the embodiments of the present invention, the simulation result is as follows.

[1.1: Simulation Setup]

It is assumed that the environment in which two antennas (or two antenna ports) are used for each link is used, i.e., $N_{tx}=N_{rx,REP}=N_{tx,REP}=N_{rx}=2$.

Except for Rx antennas of the first wireless device (UE), it is assumed that there is no spatial correlation.

The RF repeater assumes simple A/F (i.e., F=I).

The A/F is referred to a scheme for amplifying and forwarding.

[1.2: Simulation 1]

Figure 12:
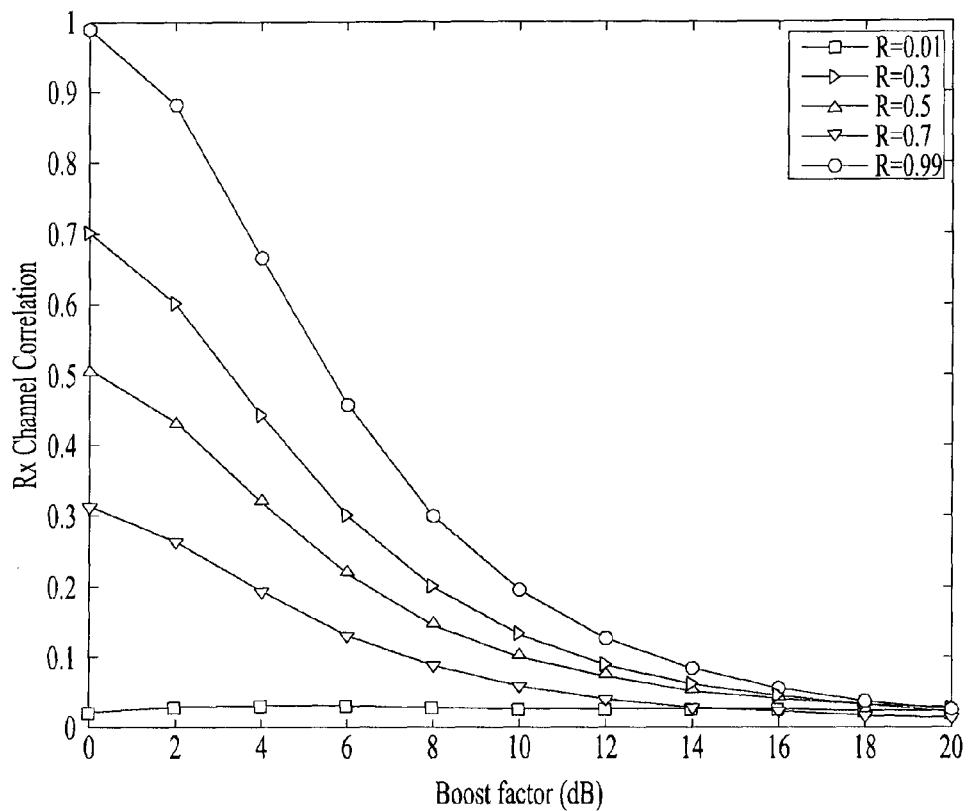
FIG. 12 shows the observation result.

A channel ($H_1$) between the first wireless device and the RF repeater is gradually diagonalized and correlation between Rx antennas of an effective channel ($H_2FH_1$) is observed. FIG. 12 shows the result of the above observation. In this case, a boost factor (BF) indicates how much a diagonal element of the channel ($H_2$) is larger than an off-diagonal element on average. For example, if BF is set to 3 dB (BF=3 dB), this means that the magnitude of a diagonal element is larger than that of the off-diagonal element two times on average. That is, the diagonalized degree of the channel ($H_2$) gradually increases in proportion to the increasing BF. As can be seen from the simulation result of FIG. 12, as the channel ($H_2$) between the first wireless device and the RF repeater is gradually diagonalized, it can be recognized that correlation between Rx antennas of the effective channel is gradually reduced. In this case, diagonalizing the channel ($H_2$) between the first wireless device and the RF repeater means that Tx antennas of the first wireless device are mapped to Rx antennas of the RF repeater on a one to one basis. In addition, as correlation between Rx antennas is increased, a gain obtained through diagonalization of the channel ($H_2$) is also increased. In FIG. 12, R is referred to a correlation of Rx antennas of the first wireless device. If the channel ($H_2$) is not boosted by BF, that is, if a distance between the first wireless device and the RF repeater is far enough, R is equal to a reception correlation of the channel ($H_2$). Upon referring to FIG. 12, Rx channel correlation of the channel ($H_2FH_1$) is equal to a value of R when the Boost factor is zero (0). If the channel ($H_2$) is boosted by BF, the higher BF is applied, the lower the Rx channel correlation of the channel ($H_2FH_1$) is obtained.

When the first wireless device such as a mobile phone is used in small-area wireless communication environments, such as inside of cars, the correlation of Rx antennas of the first wireless device is relative higher than that used in large-area wireless communication environments. In this regard, it is needed to reduce the correlation of Rx antennas of the first wireless device in order to enhance data throughput, that is, to boost is needed. In other words, in accordance with embodiments of the present application, if the RF repeater is used in small-area wireless communication environments, such as inside of cars, the channel ($H_2$) can be boosted as illustrated in FIG. 12.

In addition, the experimental result of the SNR-based channel capacity in response to BF of the channel ($H_1$) is as follows. Referring to Equation 12, if the channel ($H_1$) has high SNR, i.e., if noise and interference (i.e., $z_2$) between the first wireless device and the RF repeater can be negligible, the Equation 12 can be represented by the following equation 13.

$$y=H_2FH_1x+H_2Fz_1=H_2F(H_1x+z_1) \quad \text{[Equation 13]}$$

Figure 13:
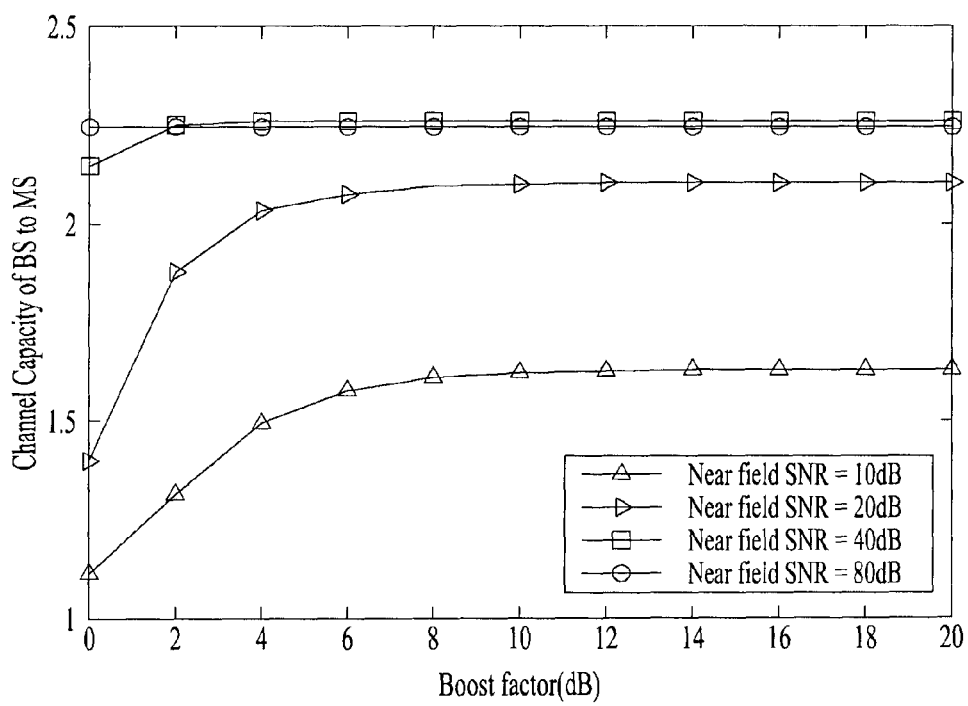
FIG. 13 shows the reception signal (y) obtained by reflecting the diagonalized effect of the channel ($H_1$).

That is, the reception signal (y) of the first wireless device is obtained by reflecting the diagonolized effect of the above channel ($H_1$) acting as a contiguous channel to both a Tx signal of the second wireless device and noise/interference of the second wireless device. Therefore, as the SNR of the channel ($H_1$) increases, a gain obtained by the link generation scheme according to embodiment(s) of the present invention disappears and only a gain caused by Rx antenna(s) of the RF repeater can be obtained only, as shown in FIG. 13.

[1.3: Modeling Method of Contiguous Channel ($H_1$)]

A relatively pathloss in response to a distance (d) between each Rx antenna of the first wireless device (UE) and each Tx antenna of the RF repeater is modeled. If the antenna position of the first wireless device is identical to the antenna position of the RF repeater, d=0 is assumed. It is assumed that a relative pathloss at d=0 is set to 0 dB. It is assumed that a relative pathloss may be denoted by the following equation 14.

$$\text{pathloss(dB)}=17(\exp(-0.2d)-1) \quad \text{[Equation 14]}$$

In addition, a MIMO channel having a general LoS (Line of Sight) environment is generated, and a relative pathloss value in response to the distance (d) between each Rx antenna of the first wireless device and each Tx antenna of the RF repeater is reflected so that the resultant MIMO channel can be generated.

In addition, it is assumed that each of power amplification of the RF repeater and the improved signal amplification gain caused by Rx-Tx antennas of the RF repeater compared to the first wireless device is denoted by 5 dB, an average pathloss between the first wireless device and the RF repeater is denoted by 15 dB, and an SNR between the RF repeater and the second wireless device is denoted by 2 dB. In addition, a reference SNR between the first wireless device and the RF repeater is variably set to an SNR on the assumption that there is no pathloss between the two devices. In addition, each of Tx/Rx antennas between the first wireless device and the second wireless device is set to 2. It is assumed that the number of external antennas (i.e., antennas for Tx/Rx used to communicate with the second wireless device) of the RF repeater is set 2. In addition, according to the link generation scheme to be used in this simulation, "Equal Gain Distributor" to be displayed in FIGS. 15 to 17, "Best Link Selector (ideal)" to be displayed in FIGS. 15 to 17, and "Best Link Selector (tx+random)" to be displayed in FIGS. 15 to 17 are used.

[1.4: Simulation 2]

FIG. 14 shows an exemplary model of the RF repeater and the first wireless device (UE) for experimenting the effect of embodiments of the present invention. FIGS. 14(a), 14(b) and 14(c) show the antenna positions of the RF repeater, and FIGS. 14(d), 14(e) and 14(f) show the antenna positions of the first wireless device. Assuming that respective antenna positions are denoted by orthogonal coordinates, the results are (a) (0, 0) (b) (−5, 0), (5, 0) (c) (0, 0), (−5, 0), (5, 0), (0, −5), (0, 5), (−5, 5), (5, 5), (5, −5), (−5, −5), (d) (−4, 4), (4, −4), (e) (0, 4), (0, −4), (f) (4, 0), and (−4, 0). In addition, this simulation assumes that the RF repeater has the same size as that of the first wireless device for convenience of description and better understanding of the present invention.

Figure 15:
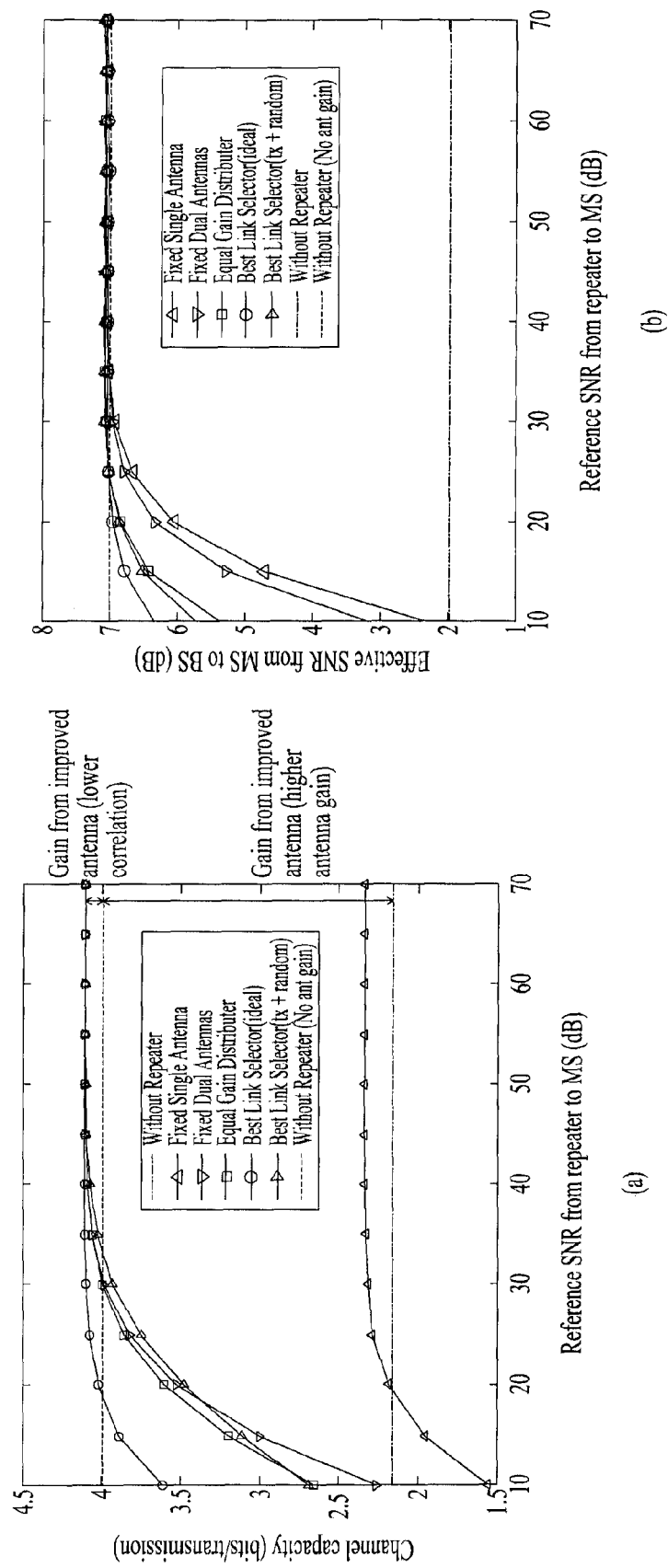
FIG. 15 shows the simulation result of the (a)-(d) combination of FIG. 14.
Figure 16:
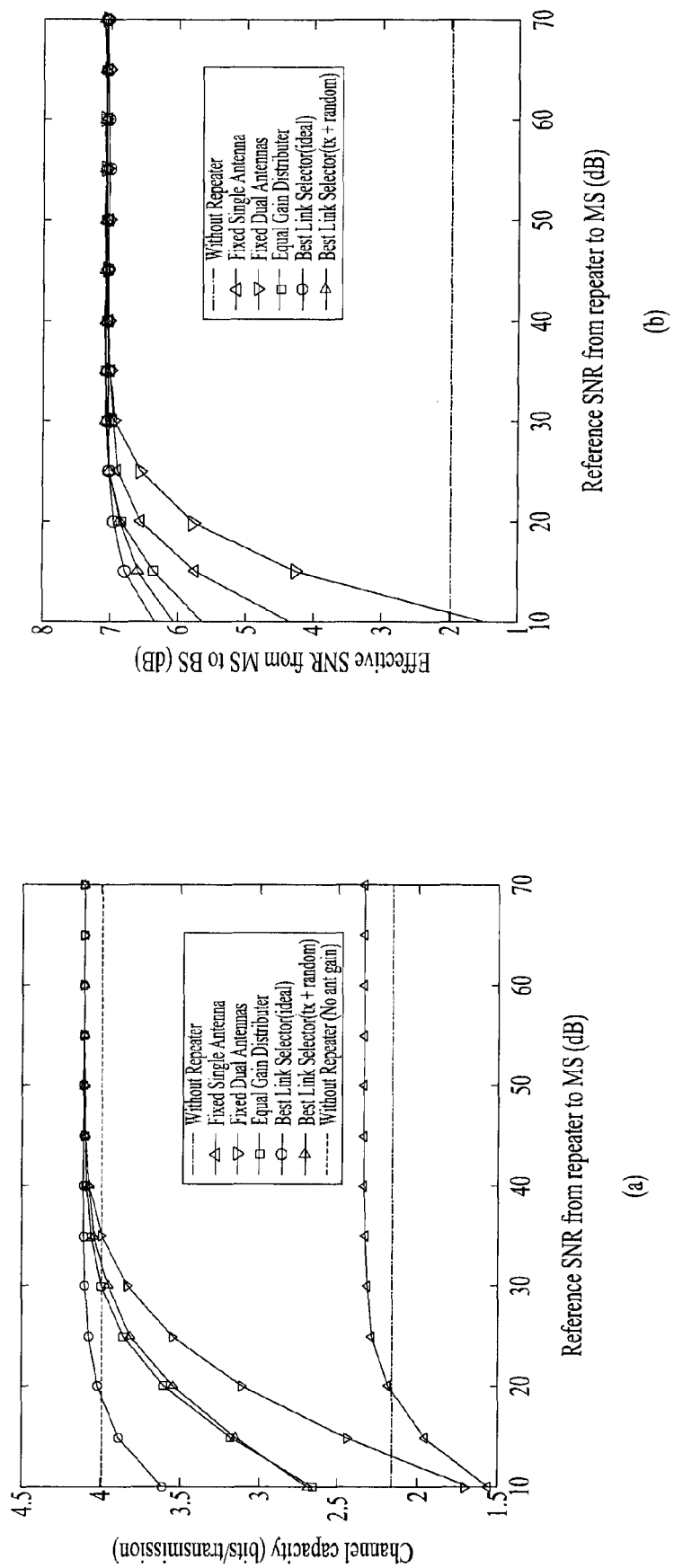
FIG. 16 shows the simulation result of the (b)-(e) combination of FIG. 14.
Figure 17:
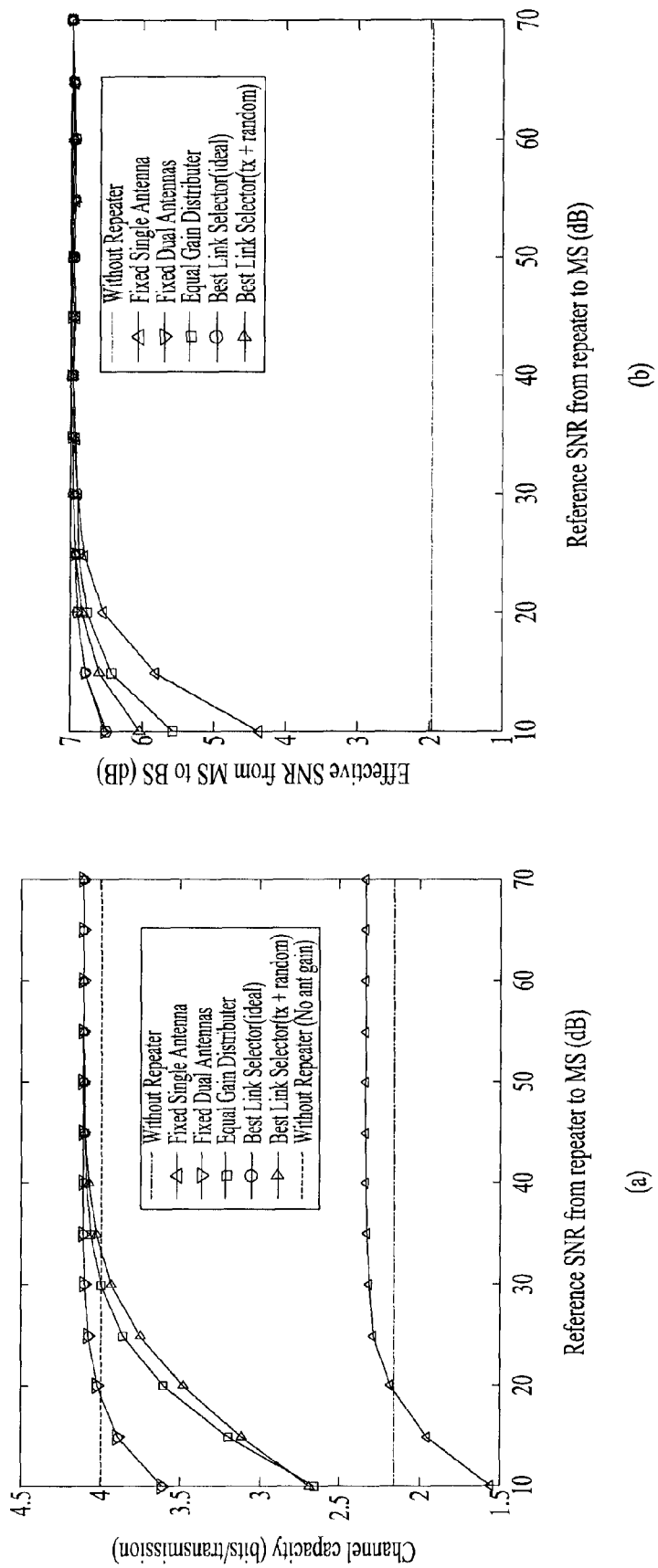
FIG. 17 shows the simulation result of the (c)-(f) combination of FIG. 14.

Combination of the RF repeater and the first wireless device shown in FIG. 14, (a)-(d), (b)-(e), and (c)-(f) simulation results are respectively shown in FIGS. 15, 16 and 17, respectively.

The simulation result of the (a)-(d) combination of FIG. 14 will hereinafter be described with reference to FIG. 15. The channel capacity is almost identical to the effective SNR when a reference SNR between the first wireless device and the RF repeater gradually increases. Referring to FIG. 15(a), a gain obtained using the RF repeater definitely appears. In case of using a low reference SNR, the link generation scheme corresponding to "Best Link Selector" has the best effect. Although the simulation result of the effective SNR shown in FIG. 15(b) is similar to FIG. 15(a), the improvement degree (effect) of the effective SNR is less than that of the channel capacity.

FIG. 16 shows the simulation result of the (b)-(e) combination of FIG. 14. Unlike the result of FIG. 15, "Fixed Single Antenna" is more preferable than "Fixed Dual Antennas" in terms of a effective SNR aspect due to a difference between antenna arrangements of the RF repeater. Compared to the Fixed Single Antenna, the Fixed Dual Antennas have poor SNR performance due to a long distance between antennas and have superior channel capacity due to guarantee of spatial dimension. The remaining results are similar to the results of FIG. 15.

FIG. 17 shows the simulation result of the combination (c)-(f) shown in FIG. 14. In FIG. 17, performance of a dual link (denoted by a line of "Fixed Dual Antennas" of FIGS. 17(a) and 17(b)) is almost similar to selection of the best-performance link (denoted by a line of "Best Link Selector (ideal)" of FIGS. 17(a) and 17(b)). The two cases indicate that Rx antennas of the same RF repeater are selected.

[1.5: Simulation 3]

Figure 18:
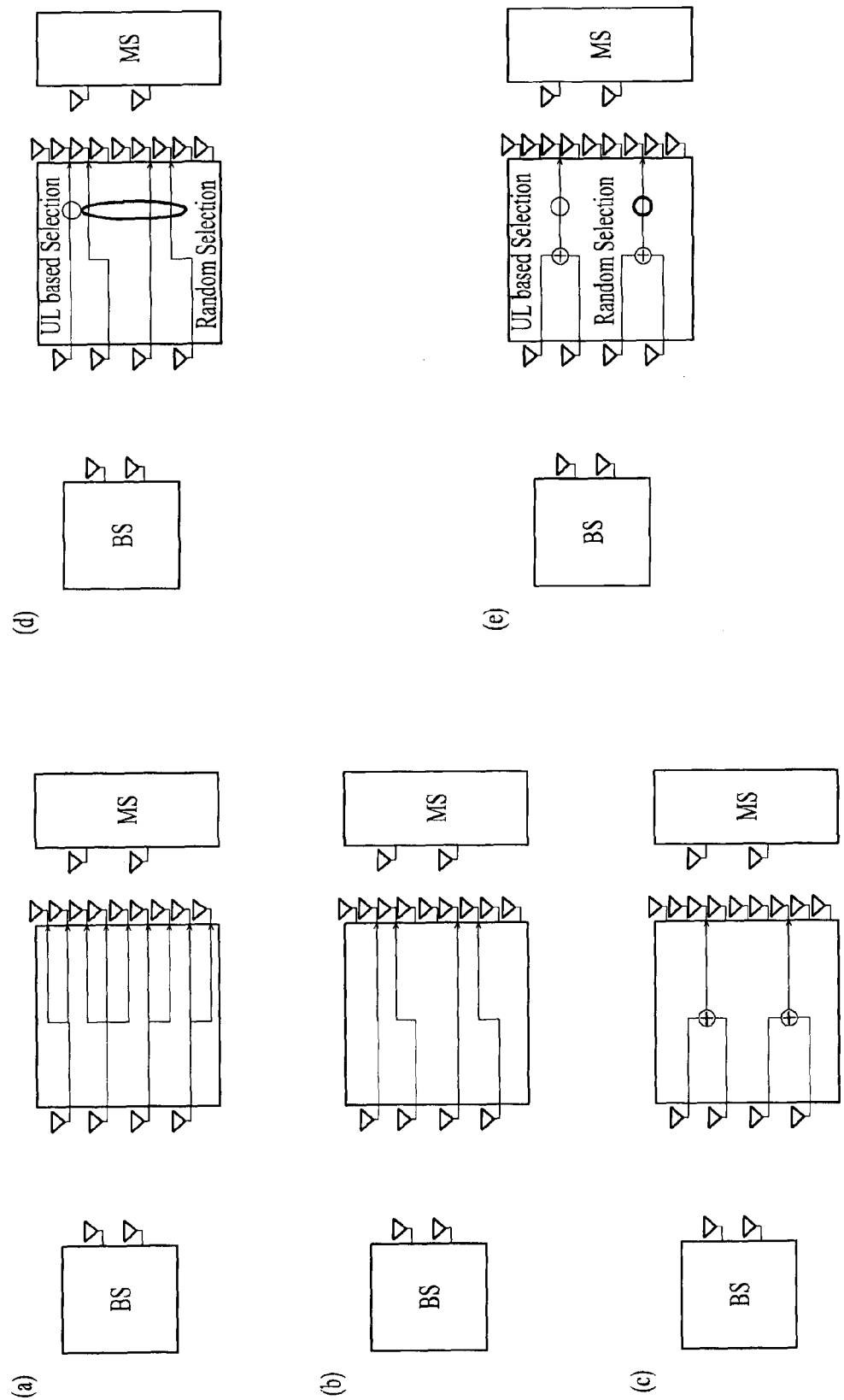
FIG. 18 shows the same gain distribution scheme.

The simulation in which $N_{rx,REP}=2$ is changed to $N_{rx,REP}=4$ will hereinafter be described with reference to FIGS. 18 to 20. Four schemes for Simulation 3 will hereinafter be described with reference to FIG. 18.

FIG. 18(a) shows the same gain distribution scheme in which the same gain is added to Rx signals of all Rx antennas of the RF repeater, and mapped to Tx antennas of M RF repeaters. In FIG. 19 to be described later, "Equal Gain Distributor" is shown. In accordance with the scheme of FIG. 18(b), $N_{rx,REP}$ signals(links) having the best Rx quality (where $N_{rx,REP}=4$) from among Rx signals received through all Rx antennas of the RF repeater are selected and mapped to Tx antennas of the RF repeater, and are mapped to Tx antennas of the RF repeater. In FIG. 19, "Best $N_{rx,REP}$ Link Selector" is shown. In accordance with the scheme of FIG. 18(c), $N_{rx}$ signals(links) having the best Rx quality (where $N_{rx}=2$ of FIG. 18(c)) from among Rx signals received through all Rx antennas of the RF repeater are selected, and are mapped to Tx antennas of the RF repeater. In FIG. 19, "Best $N_{rx}$ Link Selector" is shown. FIGS. 18(d) and 18(e) show the scheme for selecting the M value on the basis of a quality of a UL channel. The UL channel quality may be measured on the basis of a UL signal from the first wireless device to the RF repeater. Referring to FIGS. 18(d) and 18(e), a DL Tx antenna of the RF repeater may be used as a UL Rx antenna. Therefore, N Rx antennas having the best Rx signal quality are selected as DL Tx antennas in FIG. 18(d), and the remaining $N_{rx,REP}$-n Tx antennas may be selected at random. In FIG. 19, "UL based Best $N_{rx,REP}$ Link Selector" is shown. IN addition, N Rx antennas having the best Rx signal quality on uplink may be selected as DL Tx antennas in FIG. 18(e), and the remaining $N_{rx}$-n Tx antennas may be selected at random. In FIG. 19, "UL based Best $N_{rx}$ Link Selector" is shown.

FIG. 19(a) shows the simulation result of the (a)-(d) combination of FIG. 19(b) shows the simulation result of the (b)-(e) combination of FIG. 14. FIG. 19(c) shows the simulation result of the (c)-(f) combination of FIG. 14. According to the analysis results, the order of the channel capacity is Best $N_{rx}$ Link Selector→Best $N_{rx,REP}$ Link Selector→UL based Best $N_{rx,REP}$ Link Selector→Equal Gain Distributor→UL based Best $N_{rx}$ Link Selector. That is, assuming that the RF repeater correctly recognizes the position of Rx antennas of the first wireless device, it is preferable that the Rx link be selected in response to the number of Rx antennas of the first wireless device. Assuming that the positions of some Rx antennas of Rx antennas of the first wireless device are recognized, it is more preferable that a predetermined degree of the diversity gain be obtained for a certain Rx antenna, the position of which is unknown.

Figure 20:
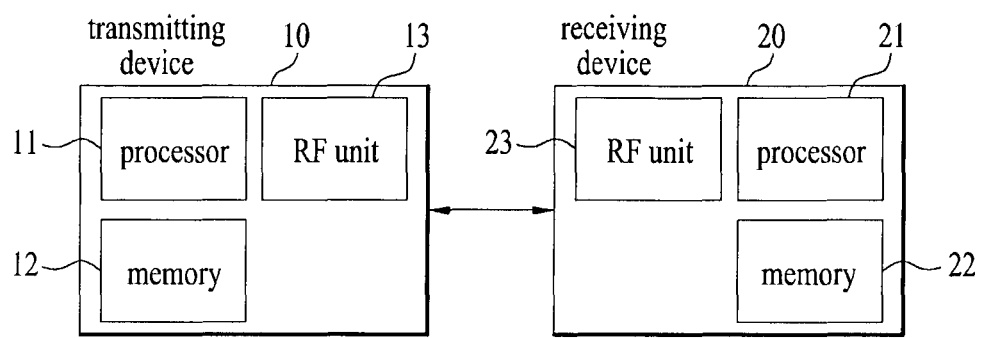
FIG. 20 is a block diagram of a transmitting device and a receiving device configured to perform UL transmission according to implement exemplary embodiments of the present invention.

FIG. 20 is a block diagram of a transmitting device 10 and a receiving device 20 configured to implement exemplary embodiments of the present invention. Referring to FIG. 21, a transmitting device 10 and a receiving device 20 respectively include Radio Frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to perform the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr (where Nr is a positive integer) receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wish to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A Reference Signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on an uplink and as the receiving device 20 on a downlink. In embodiments of the present invention, an eNB or BS serves as the receiving device 20 on an uplink and as the transmission device 10 on a downlink. In addition, in embodiments of the present invention, the RF repeater may operate as the transmission device 10 on uplink and as the receiving device 20 on a downlink. In addition, the RF unit 13 or 23 may include the Tx/Rx antennas as shown in FIG. 18, and the processor 11 or 21 may perform or implement exemplary embodiments of the present invention such as the link generation and/or the link selection as described above.

More specifically, the transmitting device 10 or the receiving device 20 may be an apparatus for receiving a downlink (DL) signal from a base station (BS) and transmitting the received DL signal to a user equipment (UE) in a wireless communication system. The apparatus may comprise a RF unit (13 or 23) including a plurality of reception antennas configured to receive. DL signals from the BS and a plurality of transmission antennas configured to transmit the received DL signals to the UE. The apparatus may comprise a processor (11 or 21) configured to map the received DL signals to at least one transmission antenna among from the plurality of transmission antennas. The processor may be configured to select M transmission antenna(s) from among the plurality of transmission antennas ($N_{tx,REP}$ Tx antennas), and map the received DL signals to the M transmission antenna(s).

The number of the transmission antennas ($N_{tx,REP}$) may be higher than the number of the reception antennas ($N_{rx,REP}$). The M may be the number of the transmission antennas which is used to transmit the received DL signals.

Additionally or alternatively, if M is higher than the number of the reception antennas ($N_{rx,REP}$), the processor may be configured to distribute at least one received DL signal from among the received DL signals and map the received DL signals including the distributed signals to the M transmission antennas, and Additionally or alternatively, if M is less than the number (Nrx,REP) of the Rx antennas, the processor may be configured to combine at least two received DL signals from among the received DL signals and map the received DL signals including the combined signal(s) to the M transmission antenna(s). The at least two received DL signals may be combined or the at least one received DL signal may be distributed on the basis of a channel quality between each of the plurality of the transmission antennas and each of reception antennas of the UE.

Additionally or alternatively, M may be decided to be one of: the number of reception antennas of the UE ($N_{rx}$), the number of the reception antennas of the reception apparatus ($N_{rx,REP}$), the number of the transmission antennas of the reception apparatus ($N_{tx,REP}$), and an integer that is equal to or higher than 1 and less than $N_{tx,REP}$.

Additionally or alternatively, M may be decided based on one of: (a) quality of a signal transmitted from the UE to the reception apparatus, (b) quality of a signal received in the UE from the reception apparatus, and (c) a relationship associated with transmission antenna(s) pre-selected on the basis of (a) or (b).

Additionally or alternatively, the relationship associated with the pre-selected transmission antenna(s) may include at least one of a distance between the pre-selected transmission antenna(s) and the M transmission antenna(s) to be selected, correlation between the pre-selected transmission antenna(s) and the M transmission antenna(s) to be selected, and statistical characteristics of antenna configuration of the UE.

Additionally or alternatively, the processor may be configured to receive information of channel quality between the plurality of the transmission antennas and a plurality of reception antennas of the UE.

Detailed UE or BS structures serving as the transmitter or the receiver may be implemented in a manner that various embodiments of the present invention are performed independently or two or more embodiments of the present invention are performed simultaneously.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

MODE FOR INVENTION

Various embodiments have been described in the best mode for carrying out the invention.

INDUSTRIAL APPLICABILITY

The method and apparatus for transmitting and receiving downlink signals according to embodiments of the present invention can be applied to a UE, a BS (eNB), a radio frequency (RF) repeater, or other communication devices in a wireless communication system.

The invention claimed is:

1. An apparatus for receiving a plurality of downlink (DL) signals from a base station (BS) and transmitting the plurality of received DL signals to a user equipment (UE) in a wireless communication system, the apparatus comprising:

a plurality of reception antennas ($N_{rx,REP}$ Rx antennas) configured to receive the plurality of DL signals from the BS;
a processor configured to map the plurality of received DL signals to at least one transmission antenna; and
a plurality of transmission antennas ($N_{tx,REP}$ Tx antennas) configured to transmit the received plurality of DL signals to the UE,
wherein the processor is configured to select M Tx antennas from among the $N_{tx,REP}$ Tx antennas, and map the received plurality of DL signals to the M Tx antennas, and
wherein the number of the Tx antennas ($N_{tx,REP}$) is higher than the number of the Rx antennas ($N_{rx,REP}$), and M is the number of the Tx antennas which is used to transmit the plurality of received DL signals, and
wherein the processor is configured to differently map the plurality of received DL signals to the M Tx antennas depending on whether or not M is higher than $N_{rx,REP}$.

2. The apparatus according to claim 1, wherein:
if M is higher than the number of the Rx antennas ($N_{rx,REP}$), the processor is configured to distribute at least one received DL signal from among the plurality of received DL signals and map the plurality of received DL signals including the distributed signals to the M Tx antennas, and
if M is less than the number ($N_{rx,REP}$) of the Rx antennas, the processor is configured to combine at least two received DL signals from among the plurality of received DL signals and map the received DL signals including the combined signal(s) to the M Tx antennas,
wherein the at least two received DL signals are combined or the at least one received DL signal is distributed on the basis of a channel quality between each of the plurality of the Tx antennas and each of Rx antennas of the UE.

3. The apparatus according to claim 2, wherein, if M is less than the number ($N_{rx,REP}$) of the Rx antennas, so as to reduce instantaneous variance of the channel quality, fewer DL signals among the plurality of received DL signals are mapped to at least one Tx antenna having higher-reception-quality at the UE side, and more DL signals among the plurality of received DL signals are mapped to at least one Tx antenna having lower-reception-quality at the UE side.

4. The apparatus according to claim 3, wherein the M is decided based on one of: (a) quality of a signal transmitted from the UE to the apparatus, or (b) quality of a signal received in the UE from the reception apparatus.

5. The apparatus according to claim 2, wherein the processor is configured to receive information of channel quality between the plurality of the Tx antennas and a plurality of Rx antennas of the UE.

6. A method for transmitting a plurality of downlink (DL) signals using an apparatus configured to receive a DL signal from a base station (BS) and transmit the received plurality of DL signals to a user equipment (UE) in a wireless communication system, the method comprising:
receiving the plurality of DL signals from the BS through a plurality of reception antennas ($N_{rx,REP}$ Rx antennas); and
mapping the received plurality of DL signals to at least one transmission antenna from among a plurality of transmission antennas ($N_{tx,REP}$ Tx antennas); and
wherein the mapping comprises:
selecting M Tx antennas from among the $N_{tx,REP}$ Tx antennas, and mapping the received plurality of DL signals to the M Tx antennas, and
wherein the number of the Tx transmission antennas ($N_{tx,REP}$) is higher than the number of the Rx antennas ($N_{rx,REP}$), and M is the number of the Tx antennas which is used to transmit the received plurality of DL signals, and
wherein the mapping of the received plurality of DL signals to the M transmission antennas is performed differently depending on whether or not M is higher than $N_{rx,REP}$.

7. The method according to claim 6, wherein:
if M is higher than the number of the Rx antennas ($N_{rx,REP}$), distributing at least one received DL signal from among the received plurality of DL signals and mapping the received plurality of DL signals including the distributed DL signals to the M Tx antennas, and
if M is less than the number ($N_{rx,REP}$) of the Rx antennas, combining at least two received DL signals from among the received plurality of DL signals and mapping the received plurality of DL signals including the combined signal(s) to the M Tx antennas,
wherein the at least two received DL signals are combined or the at least one received DL signal is distributed on the basis of a channel quality between each of the plurality of the Tx antennas and each of Rx antennas of the UE.

8. The method according to claim 7, wherein, if M is less than the number ($N_{rx,REP}$) of the Rx antennas, so as to reduce instantaneous variance of the channel quality, fewer DL signals among the plurality of received DL signals are mapped to at least one Tx antenna having higher-reception-quality at the UE side, and more DL signals among the plurality of received DL signals are mapped to at least one Tx antenna having lower-reception-quality at the UE side.

9. The method according to claim 8, wherein the M is decided based on one of: (a) quality of a signal transmitted from the UE to the reception apparatus, or (b) quality of a signal received in the UE from the reception apparatus.

10. The method according to claim 6, further comprising:
receiving information of channel quality between the plurality of the Tx antennas and a plurality of Rx antennas of the UE.

11. The apparatus according to claim 2,
wherein, if M is higher than the number of the Rx antennas ($N_{rx,REP}$), the processor is configured to:
perform grouping of the M Tx antennas into $N_{rx,REP}$ groups, and
distribute at least one received DL signal from among the plurality of received DL signals, wherein signals distributed from a single received DL signal among the plurality of received DL signals are mapped to a single group among $N_{rx,REP}$ groups,
wherein the grouping is performed based on a preference of each of the plurality of Tx antennas regarding Rx antennas of the UE.

12. The apparatus according to claim 11,
wherein, in order to reduce correlation between each of the $N_{rx,REP}$ groups, at least one of the plurality of Tx antennas having a same preference regarding the Rx antennas of the UE are grouped into one group.

13. The apparatus according to claim 11,
wherein, in order to stability instantaneous channel unbalance of a channel between each of Tx antennas of the BS and the plurality of the Rx antennas, at least one of the plurality of Tx antennas having a same preference regarding the Rx antennas of the UE are grouped into different groups respectively.

* * * * *